Feb. 16, 1943. R. H. CRAMER 2,311,213
GRINDING MACHINE
Filed July 30, 1940 16 Sheets-Sheet 4
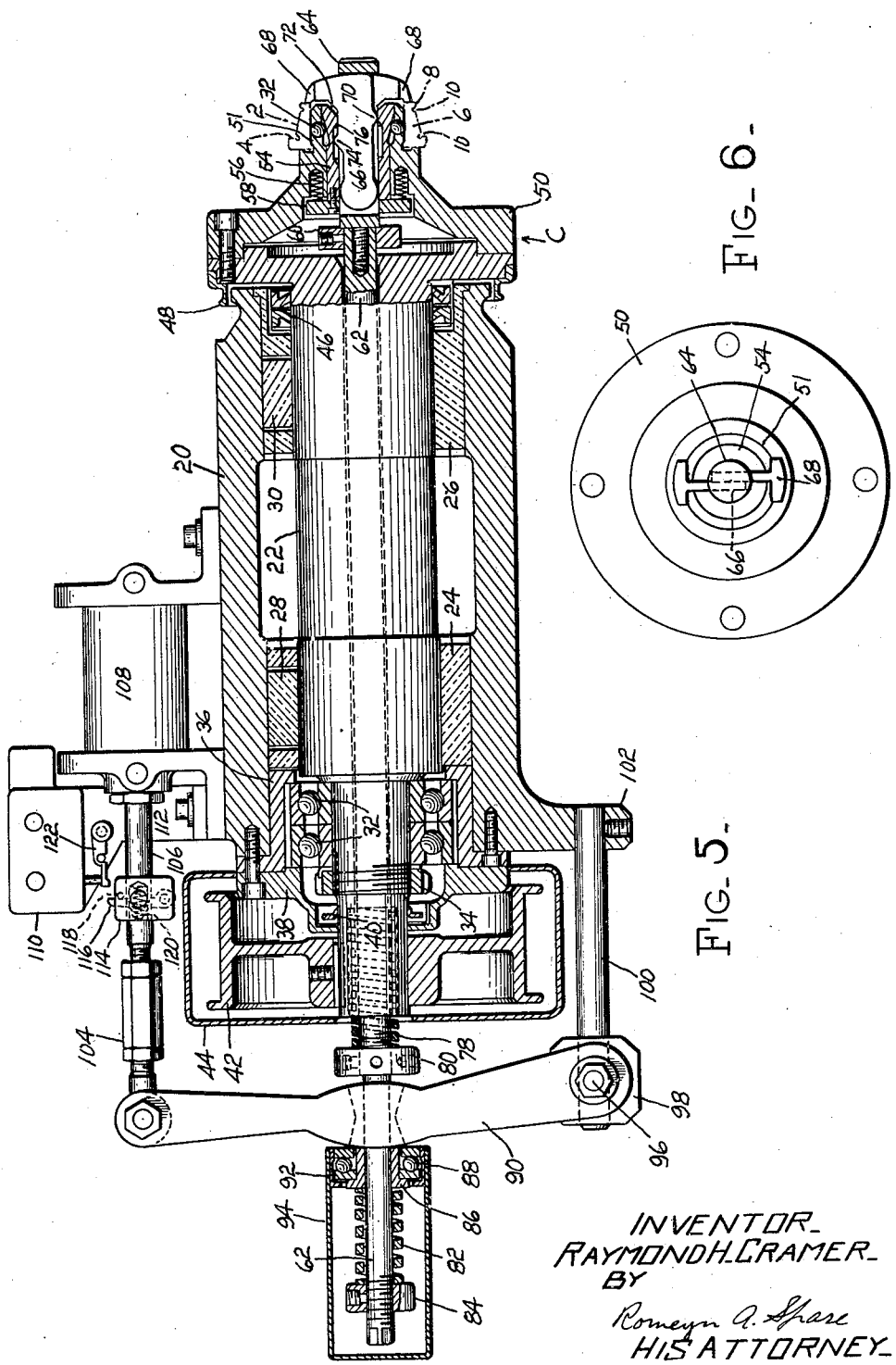
INVENTOR
RAYMOND H. CRAMER
BY
Romeyn A. Spare
HIS ATTORNEY

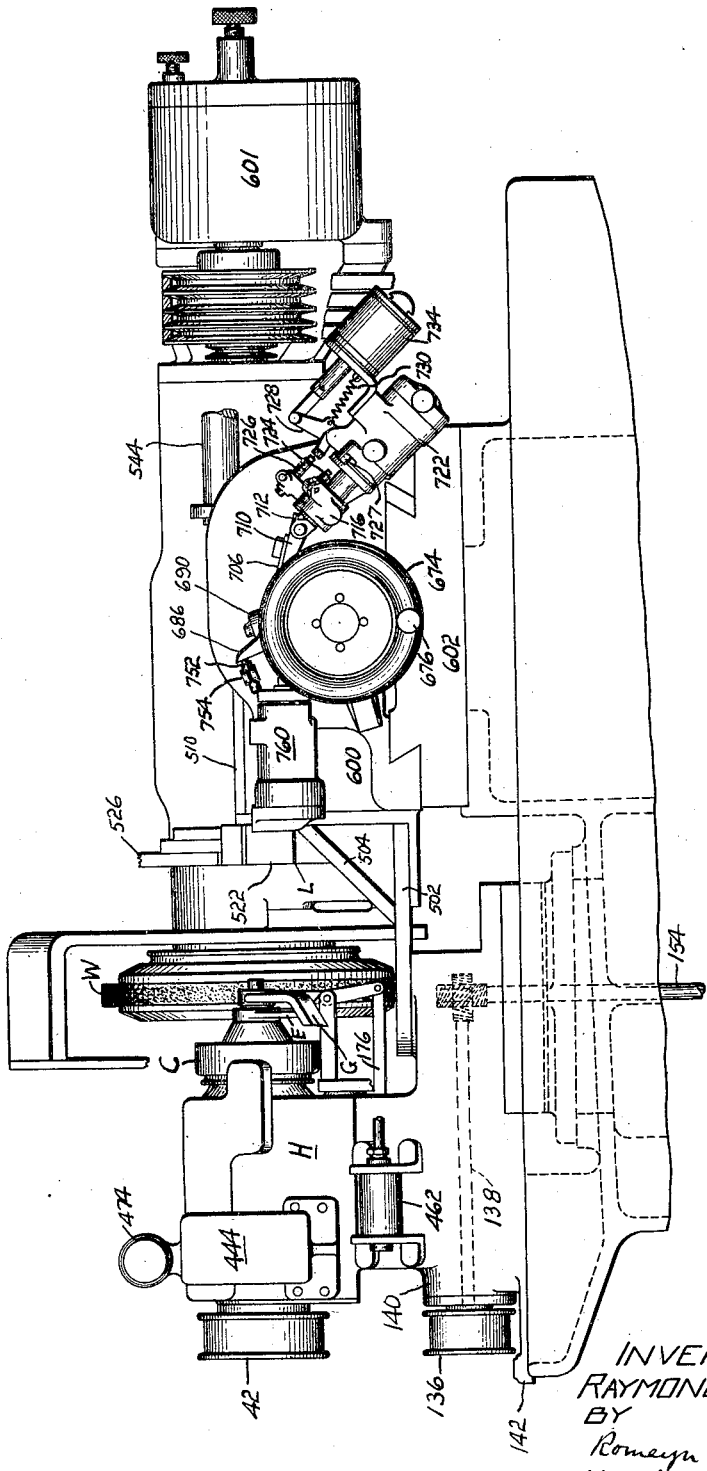

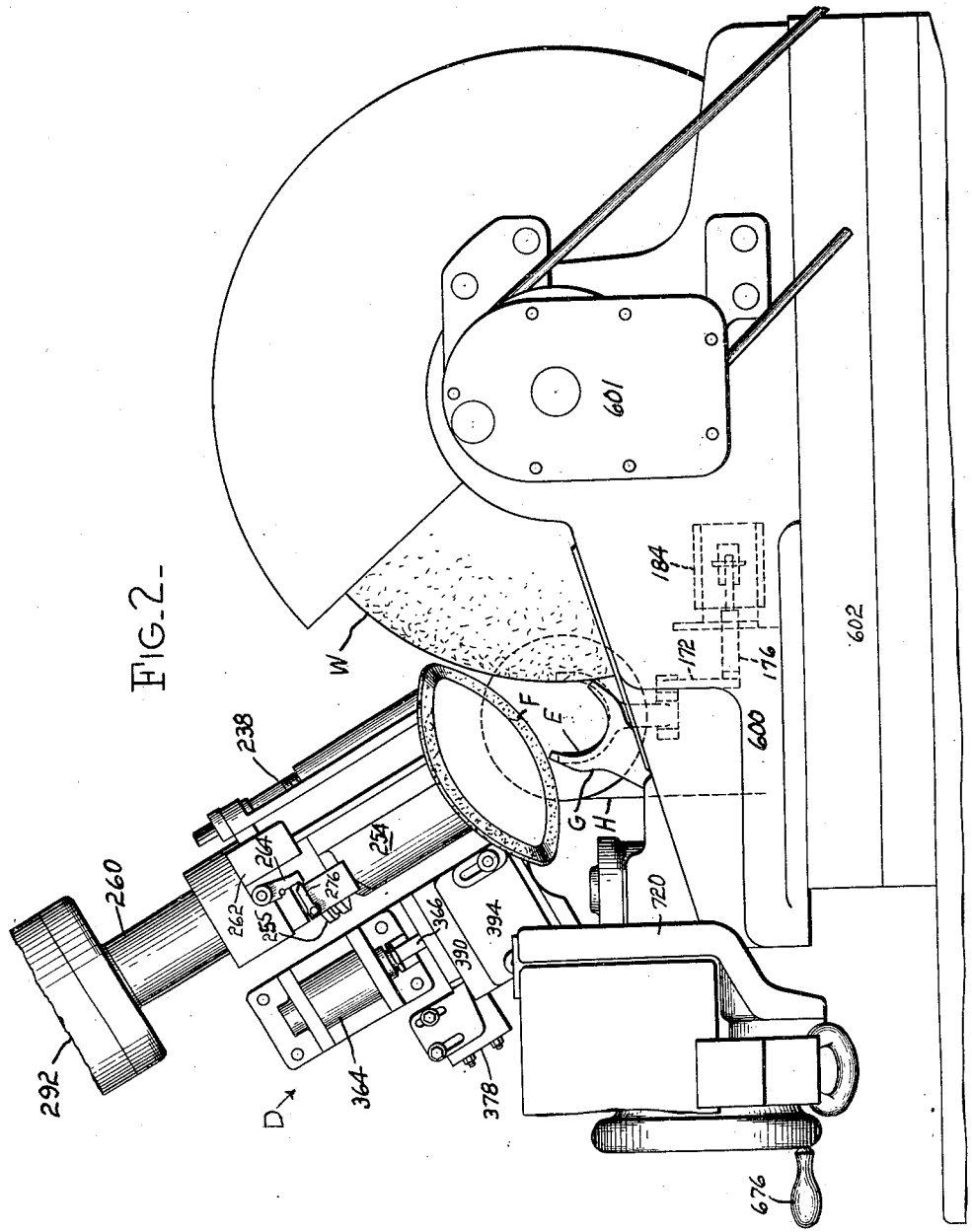

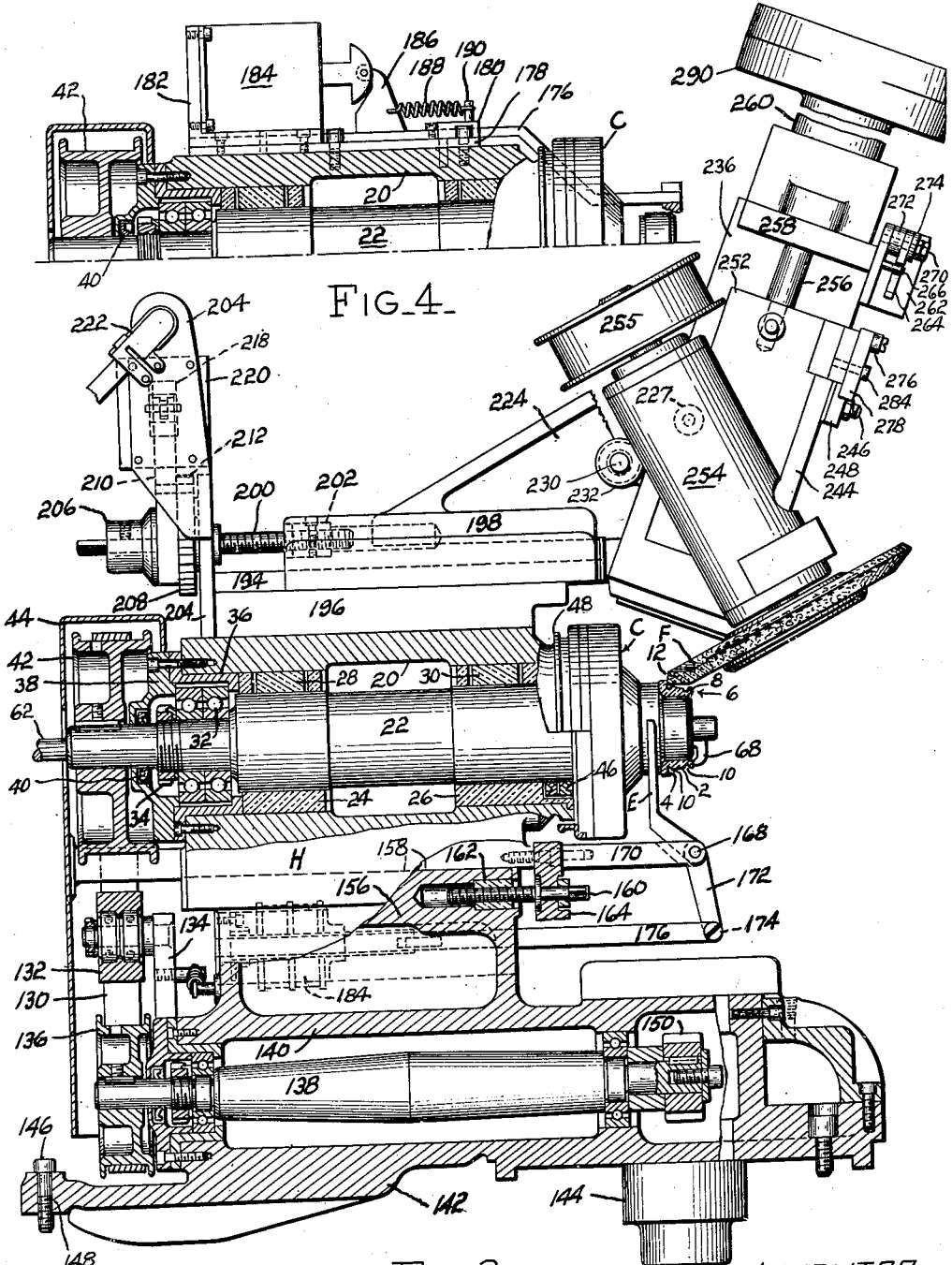

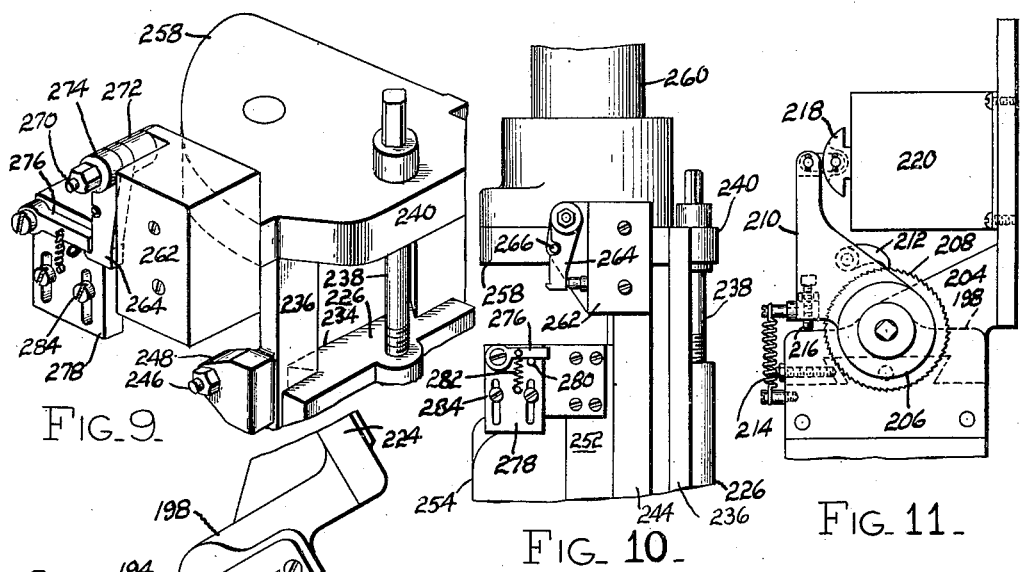
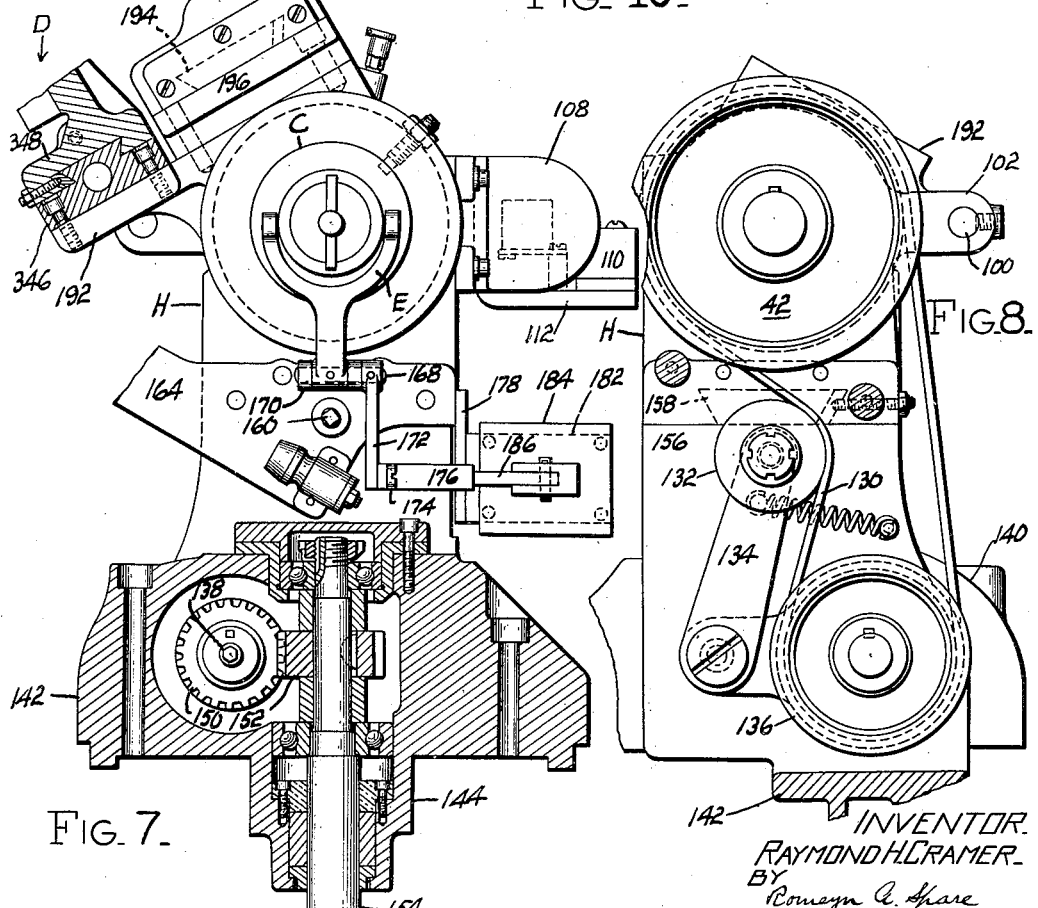

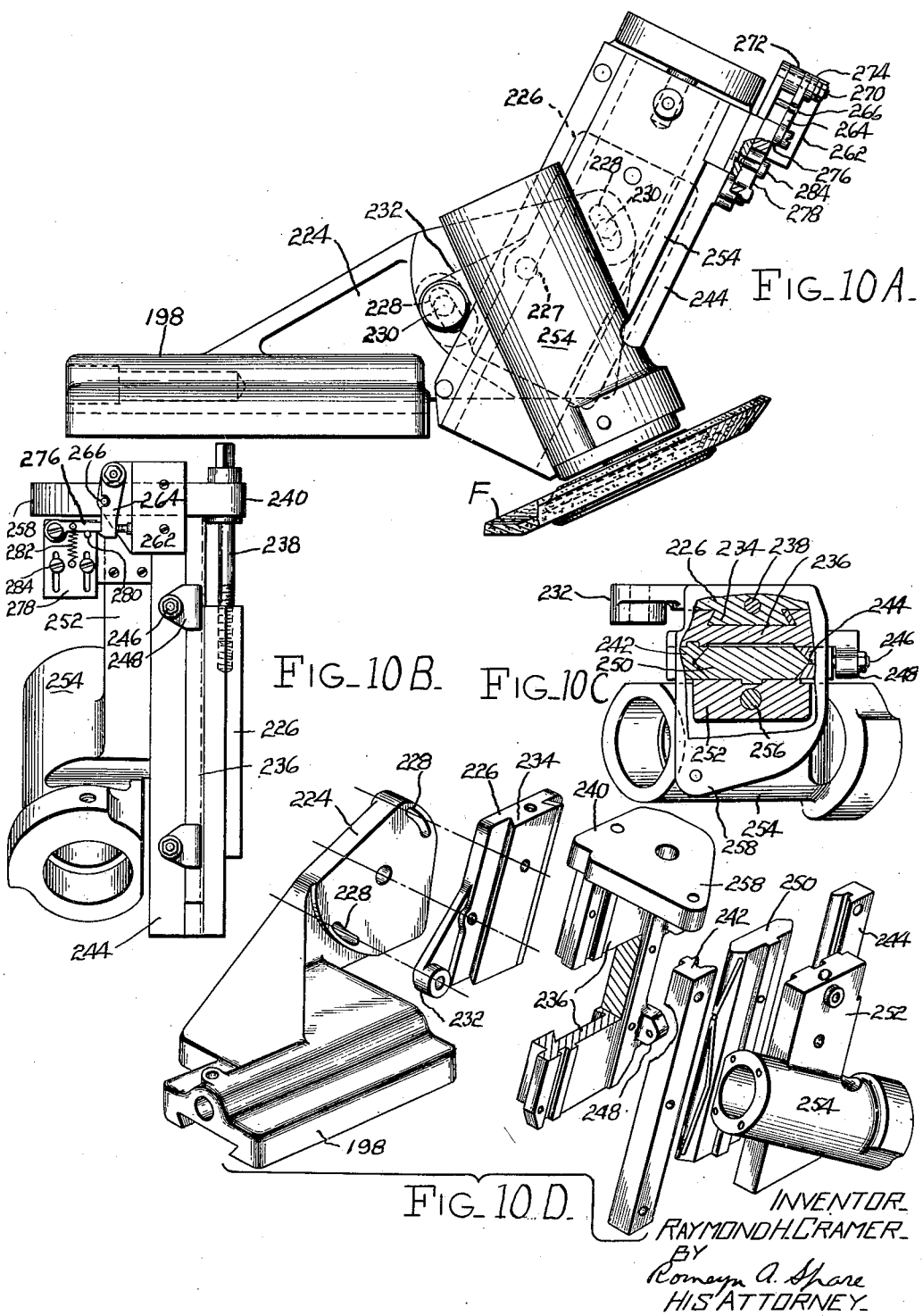

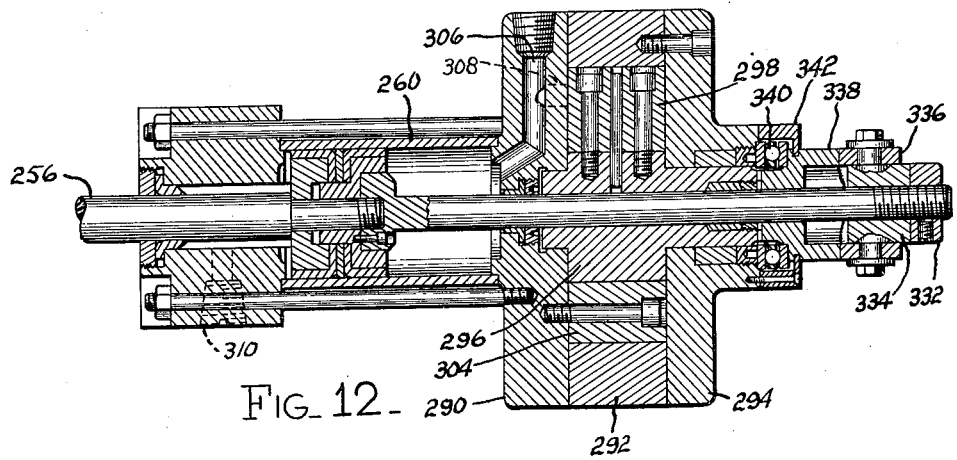
FIG. 12.
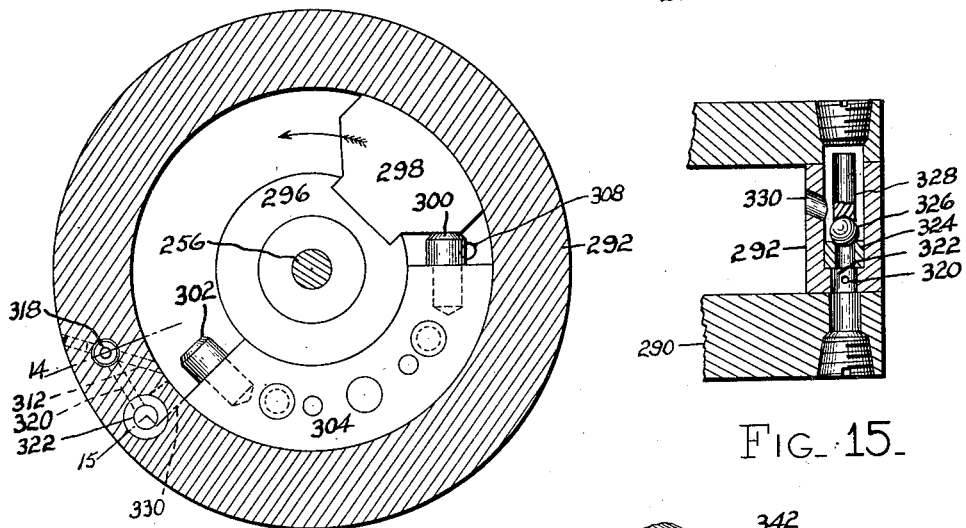
FIG. 13.
FIG. 15.
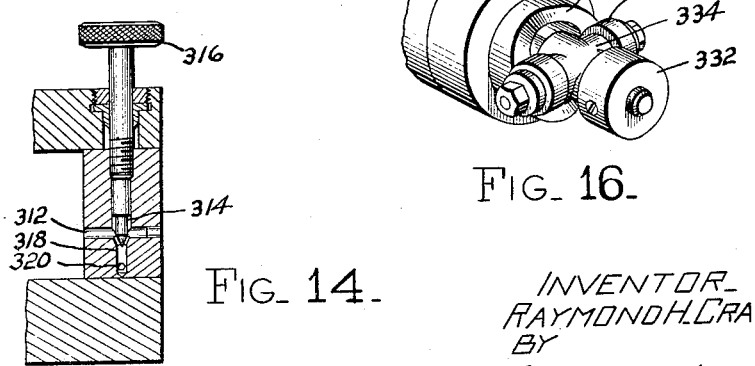
FIG. 14.
FIG. 16.
INVENTOR
RAYMOND H. CRAMER
BY
Romeyn A. Spare
HIS ATTORNEY

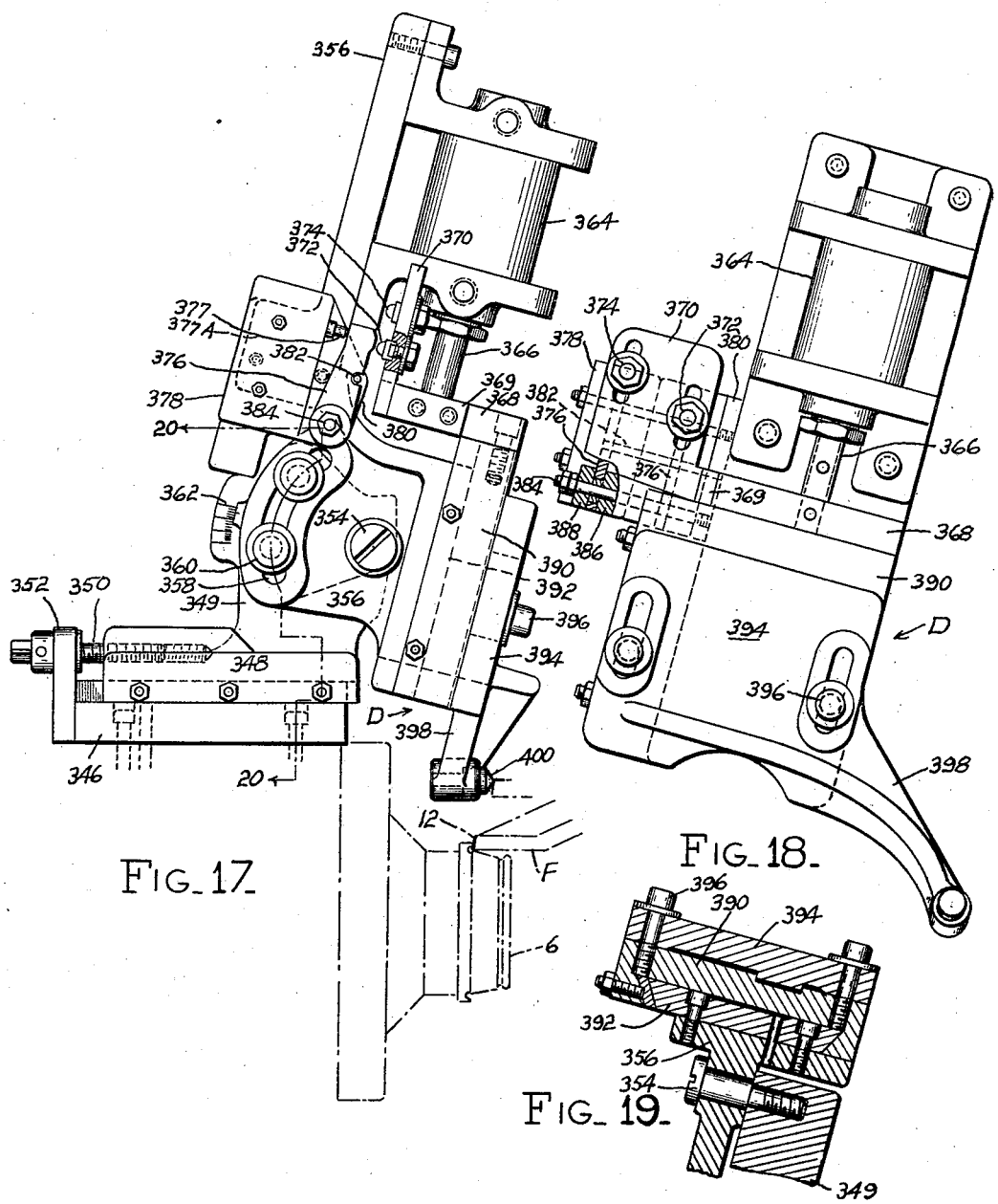

Feb. 16, 1943.   R. H. CRAMER   2,311,213
GRINDING MACHINE
Filed July 30, 1940   16 Sheets-Sheet 9

INVENTOR.
RAYMOND H. CRAMER.
BY
Romeyn A. Spare
HIS ATTORNEY

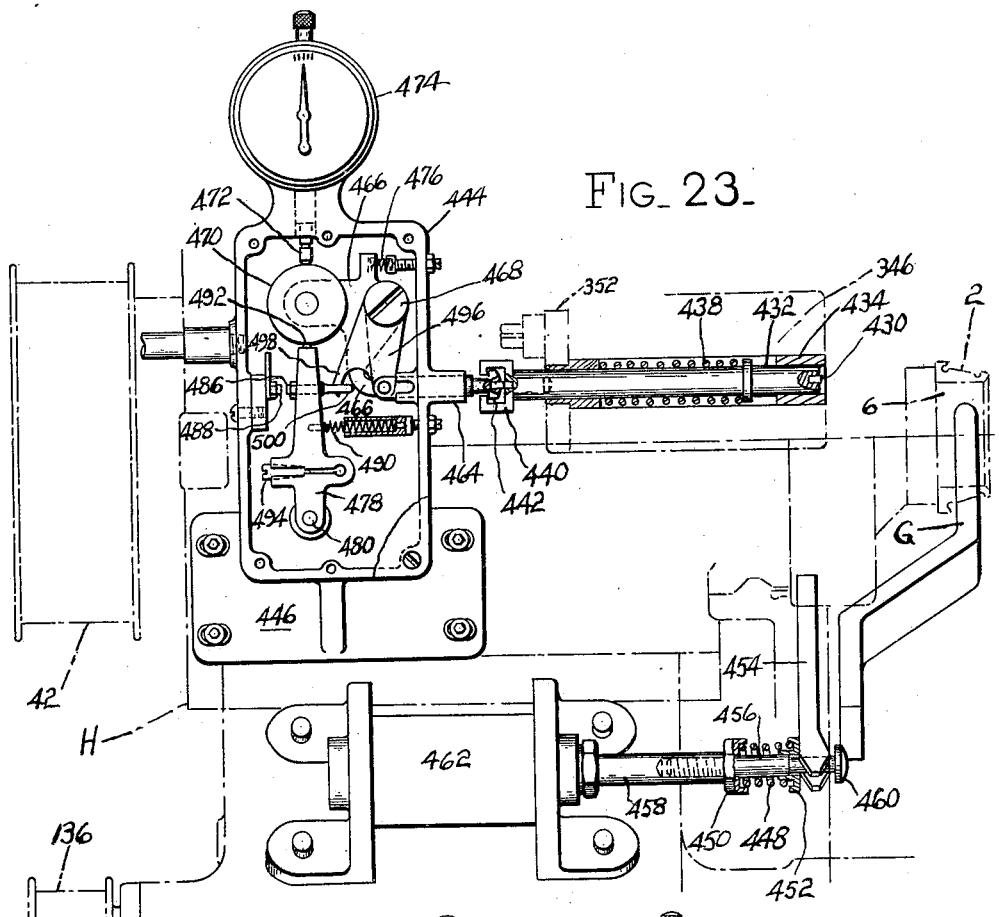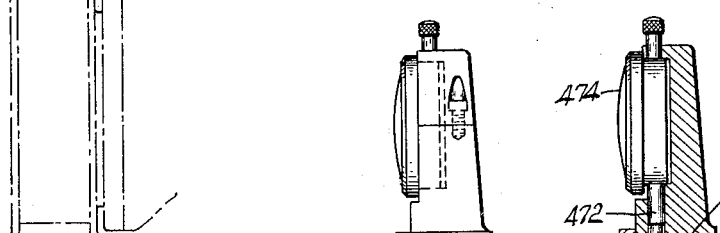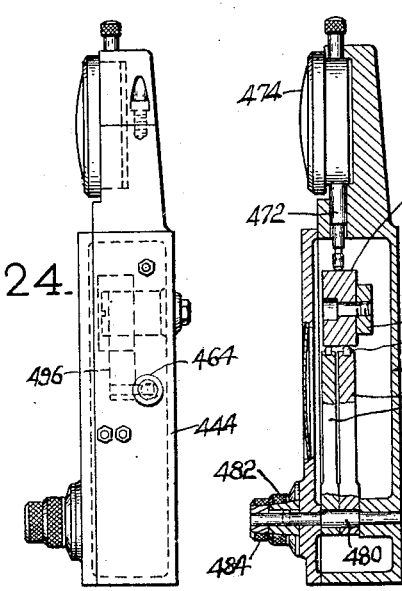

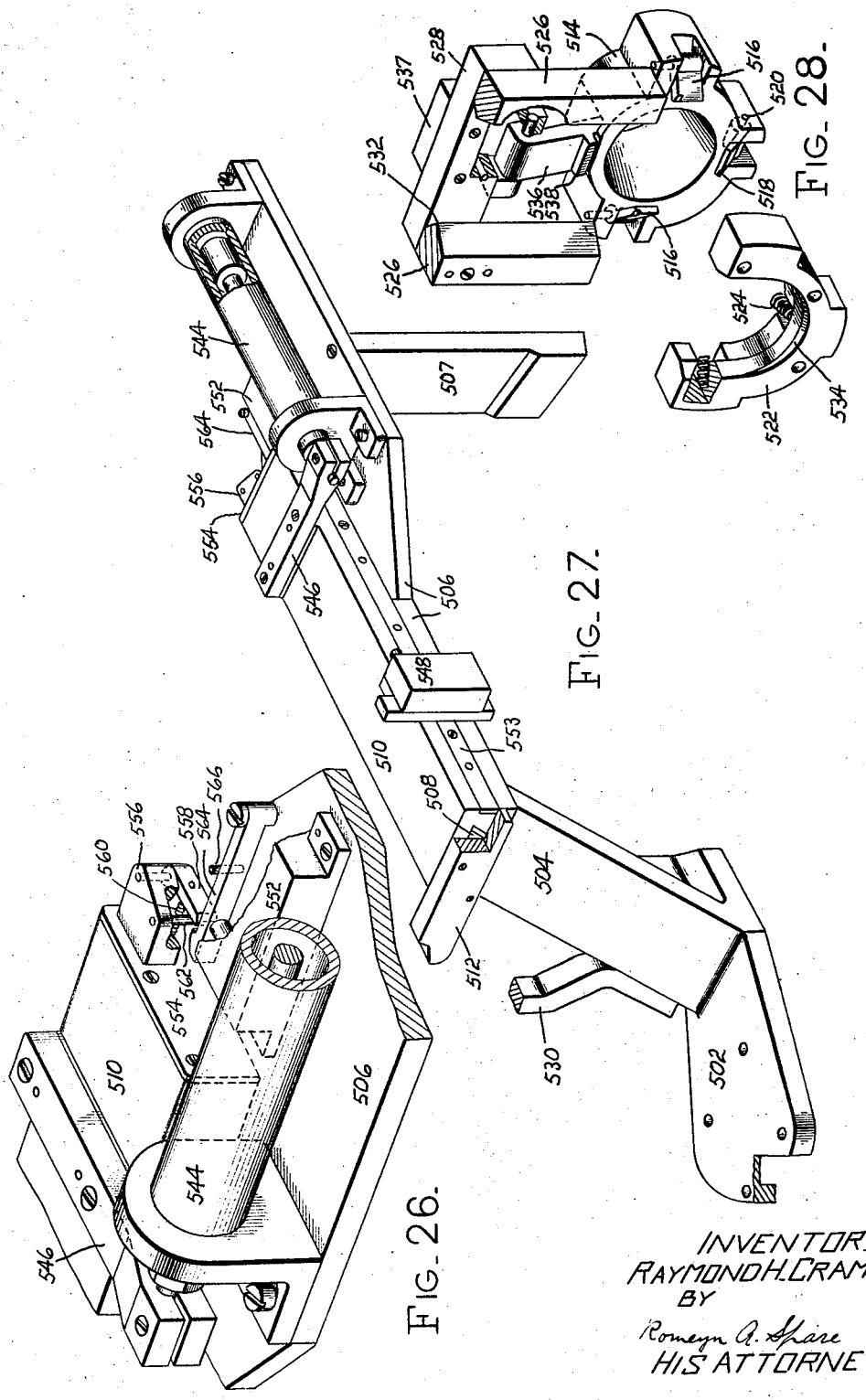

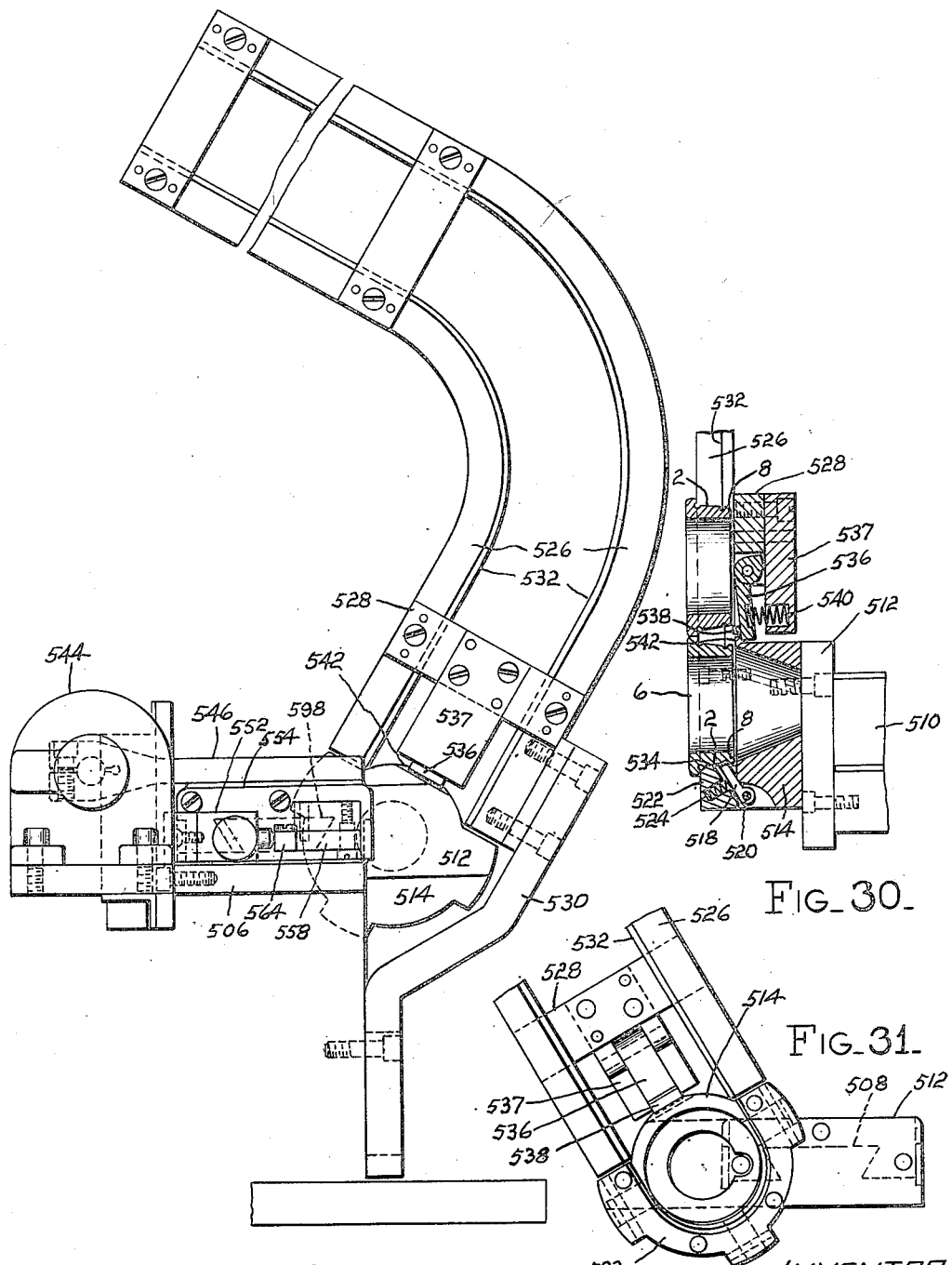

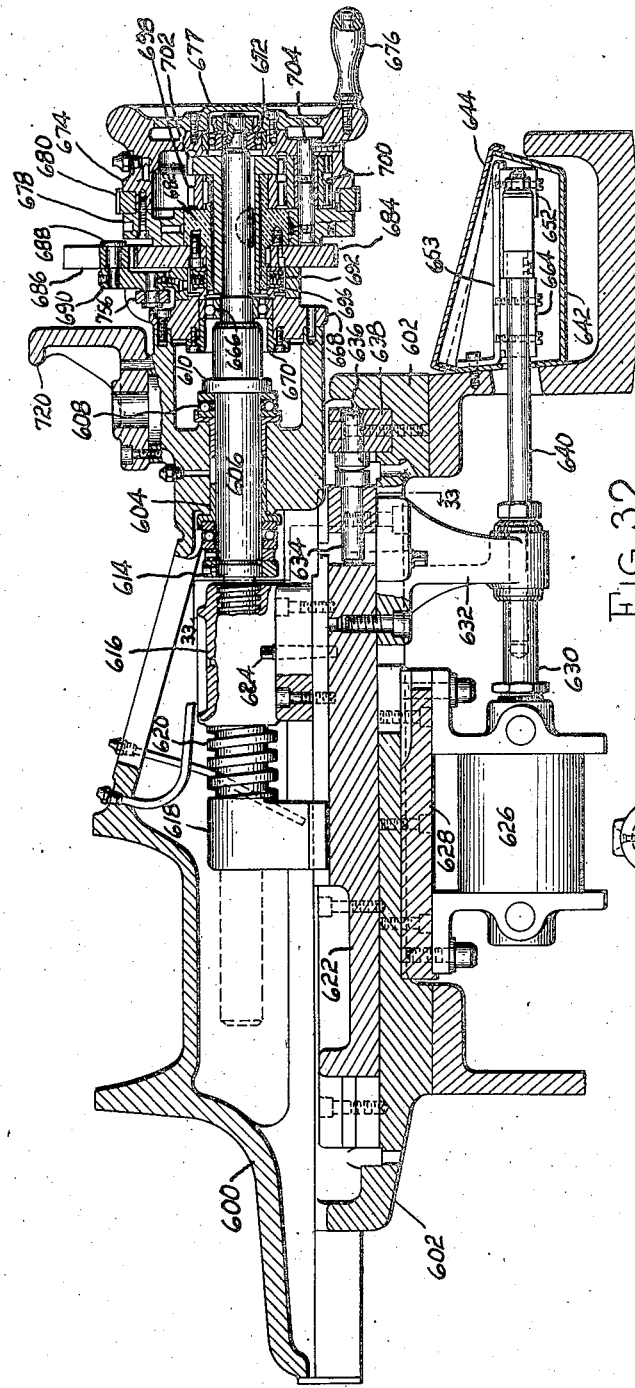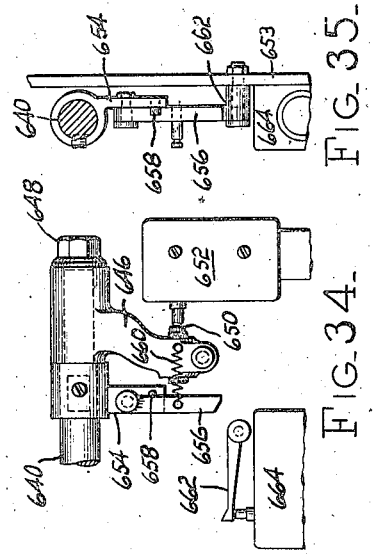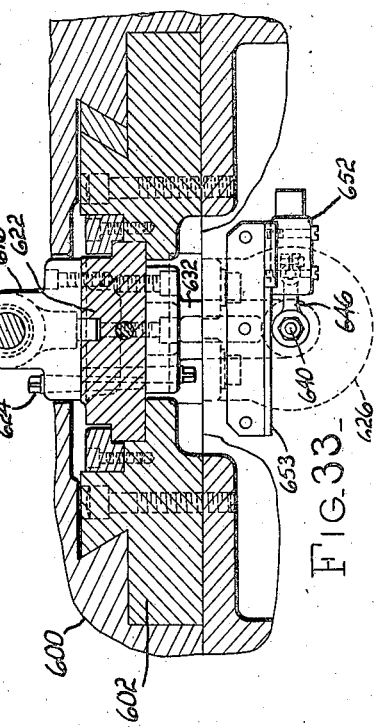

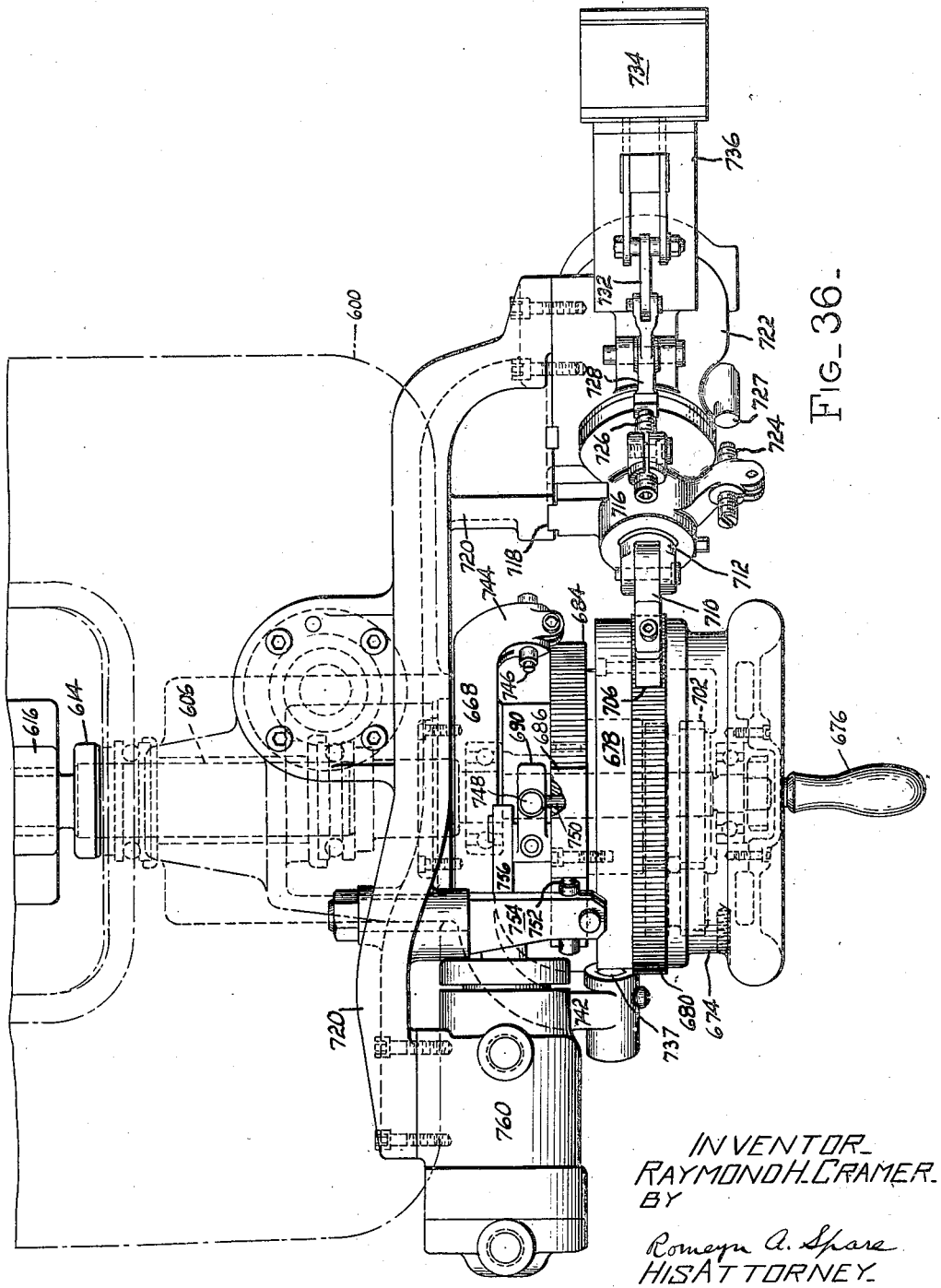

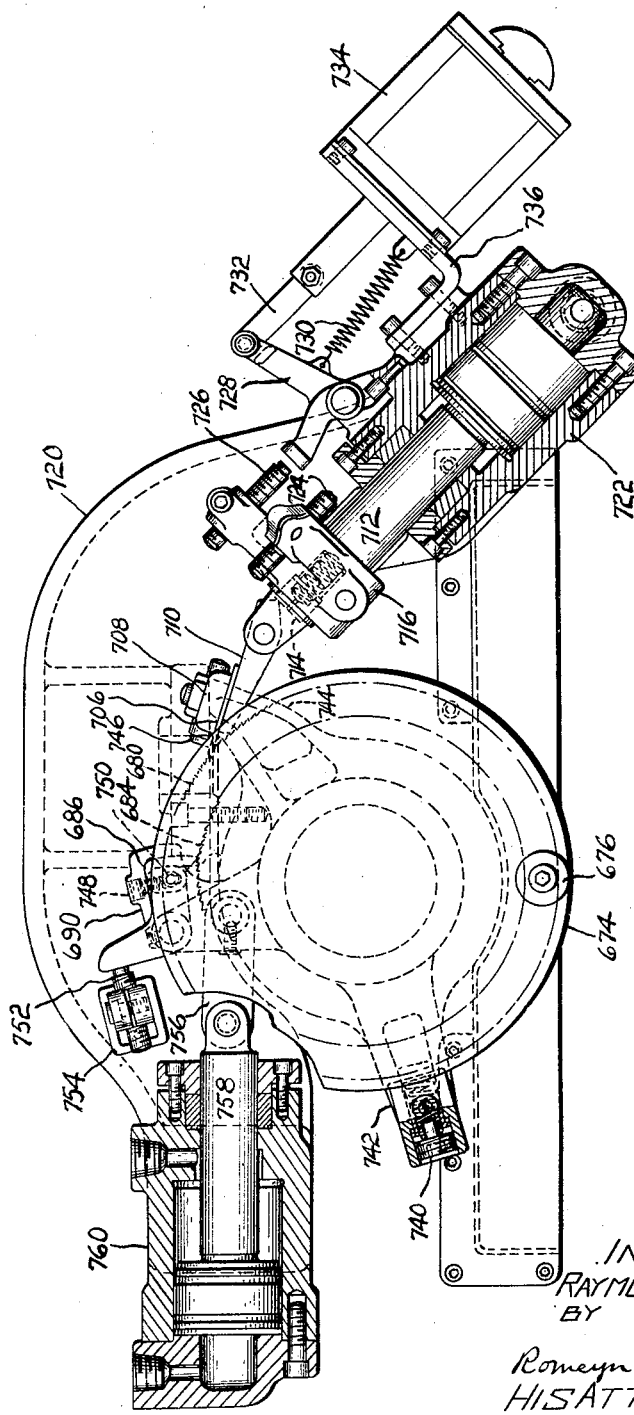
FIG_37

Feb. 16, 1943. R. H. CRAMER 2,311,213
GRINDING MACHINE
Filed July 30, 1940 16 Sheets-Sheet 16
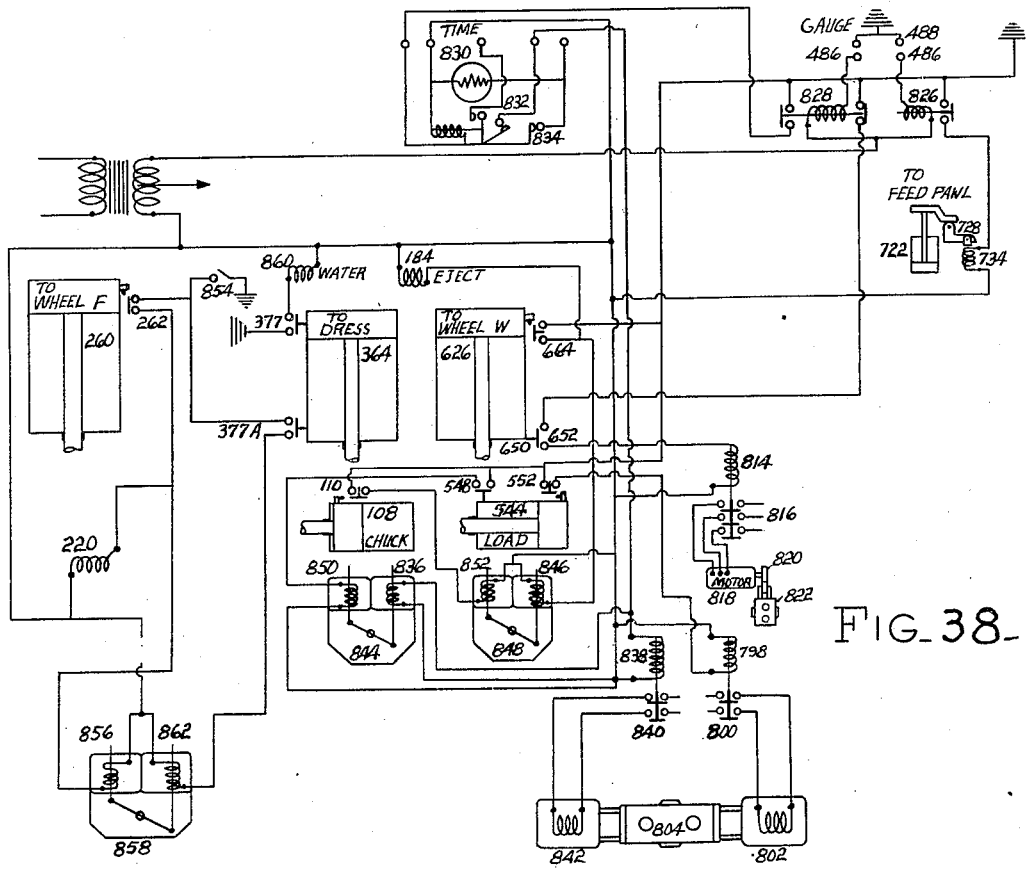
FIG_38_
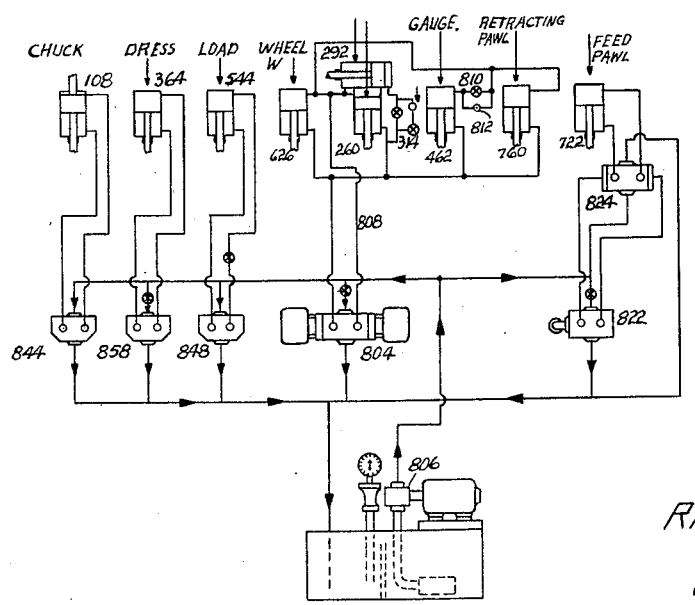
FIG_39_
INVENTOR
RAYMOND H. CRAMER
BY
Romeyn A. Spare
HIS ATTORNEY Patented Feb. 16, 1943

2,311,213

UNITED STATES PATENT OFFICE 2,311,213

GRINDING MACHINE

Raymond H. Cramer, Newark, N. J., assignor to General Motors Corporation, Detroit, Mich., a corporation of Delaware Application July 30, 1940, Serial No. 348,398

11 Claims. (Cl. 51—105)

This invention relates to grinding machines and comprises all of the features of novelty herein disclosed. An object of the invention is to provide a machine for automatically grinding tapered bearing race rings and the like. Another object is to provide a machine for the substantially simultaneous grinding of an external bearing surface and an overhanging or conical shoulder on a bearing race ring. Other objects relate to improved chucking and work loading mechanisms, improved means for advancing and retracting the grinding wheels and dressing the surface of one wheel, improved gauging or sizing devices, and improved controlling instrumentalities for governing the various devices and co-ordinating their action.

To these ends and also to improve generally upon machines of this character, the invention consists in the various matters hereinafter described and claimed. In its broader aspects, the invention is not necessarily limited to the specific construction selected for illustrative purposes in the accompanying drawings in which Fig. 1 is a front elevation, some units being omitted and some parts being broken away.

Fig. 2 is an end elevation, the loader and the gauge mechanism being omitted.

Fig. 3 is chiefly a vertical section of the work head and associated parts, some parts being shown in front elevation.

Fig. 4 is chiefly a horizontal section of a portion of the work head, some parts being shown in plan.

Fig. 5 is a horizontal section of the work head.

Fig. 6 is an end view of the chuck.

Fig. 7 is a right hand end view of the work head, some parts being in vertical section.

Fig. 8 is a left hand end view of the work head and spindle drive means, some parts being in section.

Fig. 9 is an isometric view of parts associated with the flange wheel slide.

Fig. 10 is a side view of parts appearing in Fig. 9.

Fig. 10A is a front view of the compensating slide and associated slides.

Fig. 10B is a side view and Fig. 10C is a section of said associated slides.

Fig. 10D is an exploded view of parts appearing in Fig. 10A.

Fig. 11 is a left end view of the compensating mechanism.

Fig. 12 is a sectional view of the two cylinders which control the flange wheel slide.

Fig. 13 is a cross sectional view of the short cylinder of Fig. 12.

Fig. 14 is a sectional view of the needle valve in the region of line 14 in Fig. 13.

Fig. 15 is a sectional view of the check valve in the region of line 15 in Fig. 13.

Fig. 16 is a perspective view of the cam of Fig. 12 and associated parts.

Fig. 17 is a front view of the dressing mechanism.

Fig. 18 is a side view of Fig. 17.

Fig. 19 is a cross section near the bolts of Fig. 18.

Fig. 23 is a front view of the gauge mechanism, some parts being in section.

Fig. 24 is a side view of the indicator box.

Fig. 25 is a vertical section of Fig. 24.

Fig. 26 is an isometric view partly broken away and in section of the rear portion of the loading mechanism.

Fig. 27 is an isometric view of portions of the loading mechanism.

Fig. 28 is an exploded view of parts of the loader adjacent to the magazine, with parts broken away and in section.

Fig. 29 is a view of the rear end of the loader.

Fig. 30 is a vertical section of parts of the loader adjacent to the magazine.

Fig. 31 is a front end view of portions of the loader.

Fig. 32 is chiefly a vertical section of the feed mechanism.

Fig. 33 is a cross section taken about on the line 33—33 of Fig. 32.

Fig. 34 is a bottom view of switch mechanism associated with Fig. 32.

Fig. 35 is a side view of Fig. 34.

Fig. 36 is a plan view of feed mechanism.

Fig. 37 is an end view partly in section of Fig. 36.

Fig. 38 is a diagram of electrical and hydraulic connections and

Fig. 39 is a diagram of the hydraulic system.

Figure 20:
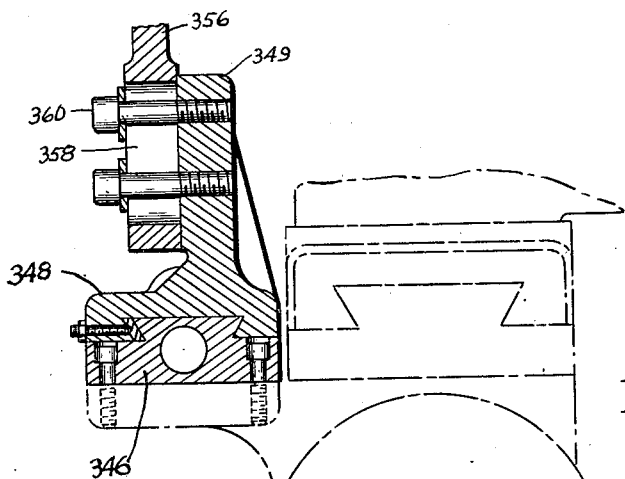
Fig. 20 is chiefly a cross sectional view taken about on the line 20—20 of Fig. 17.

This machine (see Figs. 1 to 6) is intended primarily for the grinding of a tapered raceway 2 and an overhanging flange or conical shoulder 4 on the inner race ring 6 of a tapered roller bearing. There is a rib 8 at the small end of the ring and a relief groove 10 at each side of the raceway next to the rib and next to the shoulder. The race ring is rotated by a work holder or chuck C on a work head H and the raceway is ground by a cylindrical grinding wheel W which engages the raceway at the rear of the ring and is fed forwardly by a slide. The flange or shoulder 4 is ground by a conical surface 12 at the edge of a flange on a grinding wheel F which is dished and has its drive shaft supported in a slanting position above the work. This wheel is mounted on the work head and is fed downwardly at an acute angle to the shoulder so that the entire depth of the shoulder is at once engaged by the wheel surface 12. In other words, if the shoulder makes an angle of say 13° to the vertical, the conical surface of the wheel lies at the same angle but is fed at a greater angle (say 21°) in order to make a plunge cut as distinguished from a shaving cut and so diminish breaking down of the narrow edge or corner of the wheel. A dressing device indicated generally at D dresses the surface 12.

The chuck is actuated automatically by a draw bar as will appear and the work is presented to it automatically by a loading device indicated generally at L. The work is ejected automatically by an ejector indicated generally at E and the size of the work is controlled automatically by a sizing device or feeler gauge indicated generally at G. The wheel W has a preliminary quick advance controlled by a cylinder and piston unit to a position ready to grind. Subsequent slow feed is controlled by ratchet mechanism which is first coarse and then fine controlled by the gauge. The flange grinding wheel F has a preliminary quick advance controlled by a piston and cylinder unit to a position ready to grind. Subsequent slow feed is controlled by a rotary cam operated by a vane having a needle valve and a check valve.

The machine will thus effect substantially simultaneous grinding on two closely adjacent tapered surfaces one surface 4 of which is internally conical and overhangs the other or external surface 2. The diameter of the wheel W can be of unlimited diameter to stand up without frequent dressing. The diameter of any wheel which grinds an internal conical surface is necessarily limited because a cone may be defined as the locus of a series of circles in parallel planes normal to the cone axis with such circles becoming smaller and smaller as the vertex of the cone is approached, the internal conical surface being a limiting envelope. The raceway surface 2 and the rib 8 restrict access to the surface 4 so that only a comparatively narrow surface 12 on the wheel F can meet the surface 4 and such surface 12 cannot be moved very far inwardly towards the axis of the cone and the groove 10 without interfering with the surface 2 or the rib 8. Inasmuch as the end of the chuck C should be unobstructed so that the loader can apply the work axially, the wheel F is dished and its drive shaft is slanted laterally over the work so that the wheel will require only a short retraction to provide for loading.

*Chucking mechanism*

The work head H (see Figs. 3 to 6) comprises a housing 20 in which a hollow spindle 22 is journalled for rotation by bearing sleeves 24 and 26 having bearing inserts 28 and 30. Endwise movement of the spindle is prevented by a pair of preloaded ball bearings 32 arranged back to back, the inner race rings being clamped on the spindle by a nut 34 and the outer race rings being clamped between a flanged bearing housing 36 and a dished cap 38 having a seal 40 outside of the nut. The spindle is driven by a wide belt pulley 42 enclosed within a guard 44. The pulley is made wide to provide for axial adjustment of the work head with respect to its driving means. At the chuck end, the spindle bearing is protected by a double seal 46 and the spindle has a flange carrying a water slinger 48 terminating outside of a drain groove on the housing.

Fastened to the flange by bolts is a chuck body 50 having a nose provided with a circular seat 51 loosely receiving the work and an abutment face which engages the end of a work-piece. The nose has three openings for centering balls 52 which engage inclined grooves in a centering sleeve 54 which is slidable in the nose. The sleeve is urged to centering position by coil springs 56 engaging a thrust plate 58 fixed to the sleeve. The sleeve is adapted to be moved out of centering position by an adjusting nut 60 on a draw rod 62 when the latter is moved outwardly to work releasing position. A small rectangularly slotted bar 64 is attached to the end of the draw rod by a threaded stud. Fitting side by side in the slot is a pair of flat sided shanks 66 carrying clamping fingers 68 which are extended laterally and so adapted to clamp against an ample area at the outer end of the work. The shanks have rounded ends engaging the sleeve 54 to rock therein to clamping position when little lugs 70 on the shanks run up an inclined cam surface 72 at the end of the sleeve. Other lugs 74 on the shanks enter grooves in the sleeve and are adapted to engage a conical cam surface 76 to release the fingers when the draw rod is moved to the right. The shanks are also rounded at the outer ends where they engage the ends of the slot. The engaging surfaces compel the clamping members to move with the slotted bar when the latter is moved endwise by the draw rod but there is some lost motion. There is a lost motion space between the nut 60 and the thrust plate 58 so that the fingers release the work before the centering balls 52 release it. When chucking, the balls center the work before the fingers grip it.

The draw rod 62 is supported for rotation with the hollow spindle and is always urged to clamping position by a spring 78 interposed between a shouldered recess in the spindle and an adjusting nut 80 on the draw rod. A heavy spring 82 furnishes the bulk of the clamping pressure by being interposed between an adjusting nut 84 and a flanged bushing 86 carrying a thrust bearing 88, one race ring of which bears on a rounded surface on an actuating lever 90, the lever having a double tapered hole for the draw rod 62 and clearing the flanged bushing. The thrust bearing housing 92 supports a shield 94 enclosing the spring. The parts to the left of the lever 90 can be omitted when the spring 78 is of sufficient strength and are added merely to produce more spring pressure. The lever is pivoted at 96 to a fulcrum block 98 fixed to a bar 100 which is fastened to a lug 102 on the front of the spindle housing. The free end of the lever has an oversize hole by which it is pivotally connected to a turnbuckle 104 which is connected to a piston rod 106 projecting from a cylinder 108. The piston rod is adapted to swing the lever 90 against the nut 80 to move the draw rod to chuck releasing position. The movement of the piston also operates the plunger of a switch in a box 110 secured by a bent bracket 112 to the rear of the spindle housing. For this purpose, a block 114 is clamped to the piston rod and carries a pivoted dog 116 which is urged towards a stop pin 118 by a light coil spring 120. The end of the dog can ride idly over a lever 122 pivoted on the switch box bracket when the piston rod moves to the right. When, however, the piston rod is moved to the left to cause the chuck to grip the work, the dog 116 will engage a cam incline on the lever 122 and operate the switch. This switch, as will appear, is closed to energize a solenoid which reverses a valve controlling the action of a work loading cylinder.

Spindle drive and work head adjustment

The wide pulley 42 (Fig. 3) is driven by a belt 130 running past a take-up idler pulley 132 mounted on a spring pressed arm 134, the belt running around a pulley 136 on a shaft 138 which is journalled in ball bearings in a housing 140 formed on an angularly adjustable plate 142 having a hollow trunnion 144. The trunnion forms a pivot so that the plate and supported work head can be oscillated on the main frame, as for the grinding of arcuate surfaces, or the plate can be swung to a selected angular position (depending on the taper of the work surface 2) and clamped by bolts 146 passing through arcuate slots 148 into the main supporting frame. The shaft 138 has a spiral gear 150 driven by a spiral gear 152 (Fig. 7) on a vertical shaft 154 journalled on ball bearings in the plate 142 and passing down through the hollow trunnion to appropriate driving means.

The housing 140 has a raised portion 156 with a dovetail tongue 158 on which the work head H is adapted for horizontal adjustment, as by means of a screw 160 threaded in a nut 162 and journalled for rotation without endwise movement in a bracket 164 fastened by bolts to the work head. This adjustment is preliminary and is for the purpose of bringing the back face of the work-piece into the proper plane for co-operation with the grinding wheel W. The bracket 164, as will later appear, extends towards the front of the work head and supports the feeler gauge.

Ejector mechanism

The ejector E (Figs. 3, 4 and 7) is in the form of a pivoted fork embracing the chuck and lying next to the work. The ejector is secured to a rock shaft 168 rockably supported by a forked bracket 170 secured to bracket 164. An arm 172 is pinned to the rear end of the shaft and is slotted to receive a pivot screw 174 on a slide bar 176 which is bent to clear the rear of the work head and is slidably mounted in back of a flat guide plate 178 secured at the rear of the work head. The slide bar is guided in a channel of a short guide plate 180 and in a channel in the base portion of an angle bracket 182, both such members being secured to the guide plate 178. A pull solenoid 184 is secured to the angle bracket and its plunger is attached to a lug 186 on the slide bar 176 to pull the slide bar in opposition to a return spring 188 which is attached to the lug and anchored to a pin 190.

Flange wheel feeding and compensating mechanism

The top of the work head H has a forwardly and downwardly inclined pad 192 (Figs. 3 and 7) forming a support for two slides, one slide being a compensating slide supporting the flange grinding wheel F and its feed mechanism, and the other supporting the dresser D and its actuating mechanism. The slideway for the first slide is formed by a dovetail tongue 194 on a plate 196 fastened to the inclined pad 192 by bolts. The compensating slide 198 is adjustable by a screw 200 threaded in a nut 202 and journalled for rotation without endwise movement in an angle bracket 204 having one leg fastened at the end of the plate 196. The feed screw has a knob 206 for manual operation and is keyed to a ratchet wheel 208 for automatic adjustment. Swinging on the hub of the ratchet wheel is a lever 210 (Fig. 11) carrying a pawl 212. A coil spring 214 urges the lever in one direction to bring an adjustable stop screw 216 against a face on the bracket 204, this being to adjust the stroke of the pawl. The end of the lever is connected by a link to a plunger 218 on a pull solenoid 220 mounted on the other leg of the bracket 204. Wires leading to the solenoid are mounted on a clamp 222. The ratchet mechanism feeds the compensating slide 198 to the left a short step at every machine cycle to compensate for wear and dressing of the flange grinding wheel.

The compensating slide 198 has a more or less upright web 224 (Figs. 10, 10A, 10B, 10C, 10D) which supports a swivel plate 226 having ways for guiding a slide which adjusts the flange grinding wheel F up or down towards or from the work, the angle or direction of feed being adjustable also. Pressed into a hole in the web 224 is a pivot pin 227 which pivotally supports the swivel plate 226 by entering a hole therein. The web 224 also has arcuate slots 228 through which clamping bolts 230 are passed into tapped holes in the swivel plate, one tapped hole being in a side lug 232 on the swivel plate and the other at the center line. The swivel plate has a dovetail tongue 234 on the front to fit a dovetail way in a slide 236, the slide being adjustable manually up and down by a screw 238 threaded in a tapped hole in the swivel plate and journalled for rotation without endwise movement in a lug 240 on the rear of the slide at the top. This is a preliminary or set-up manual adjustment and another slide or block on the slide 236 feeds the wheel F towards or from the work automatically.

The front face of the slide 236 has bolted thereto a fixed gib 242 having a V-shaped slideway mating with a similar slideway on a gib 244 which is adjustable by screws 246 threaded in side lugs 248 on the slide. The mating ways form a slideway for a feed block or second slide 250 which is bolted to the rear or bottom face of an angular extension 252 on a sliding spindle housing 254 in which the slanting drive shaft of the flange grinding wheel F is journalled by any suitable bearings. The shaft has a wide pulley 255 (Fig. 3) driven by a belt from a suitable motor. The angular extension is secured to the end of a piston rod 256 which passes freely through a hole in a flange 258 at the upper end of the slide 236, the piston rod being connected to a piston in a cylinder 260 which is bolted to the upper face of the flange 258. The V-shaped ways are protected by a dust guard. The spindle housing and its extension together with the attached block 250 form a feed slide which is rapidly fed towards the work ready to begin grinding, this slide afterwards feeding forwardly very slowly under control of a cam which is rotated by a vane in a cylinder attached to the top of the cylinder 260 as will later appear.

The sliding return or upward movement of the flange grinding wheel is made to control a switch 262 (Figs. 3, 9 and 10) having a plunger engaging a switch lever 264 and urging it towards a stop pin 266, the switch being secured by a bracket to the flange 258. The lever is pivoted on a pivot screw 270 between a thick spacer 272 and a thin spacer 274, these parts being held by lock nuts on the pivot screw. The switch lever lies in the path of a dog 276 pivoted on a plate 278 and urged towards a stop pin 280 by a light coil spring 282. The plate has elongated slots and is adjustably secured by clamping screws 284 to a bracket on the angular extension 252. On the return or upward movement of the flange grinding wheel and its slide, the dog 276 will actuate the switch lever 264 and close the switch but upon the advance the dog will swing idly over the hooked end of the switch lever. This switch controls a solenoid which as will appear, reverses a valve to actuate the dressing device D which dresses the wheel F along its conical operating face 12.

*Piston and cylinder feed*

The cylinder 260 has (Figs. 12 and 13) its upper head 290 of large diameter and forming the lower head of a short cylinder 292 having an upper head 294. The piston rod 256, including a detachable extension which clamps against the piston, passes through both cylinders and through a sleeve 296 journalled in the cylinder heads and turning freely around the piston rod extension. A rotor or vane 298 is attached to the sleeve by screw bolts and is adapted to operate between stop screws 300 and 302 fastened to the ends of a segment 304 bolted to one cylinder head. When feeding the flange wheel forward, pressure fluid enters the cylinder 260 through a port 306 and enters the cylinder 292 through a branch port 308, port 308 coming in near the stop screw 300. Exhaust fluid leaves the cylinder 260 at a port 310 and leaves cylinder 292 through a small port 312 (Fig. 14) leading to a needle valve 314 which is adjustable by a hand wheel 316. Port 312 communicates past the needle valve with a longitudinal port 318 leading to a circumferential port 320 which comes into a longitudinal exhaust port 322 of large diameter. Movement of the vane or rotor 298 in one direction is thus very slow depending on the setting of the needle valve.

When the flow of fluid is reversed, the port 322 becomes the entrance port and port 308 becomes the exhaust port. The entrance port 322 leads through a ball seat 324 to lift a ball check valve 326 towards a loose stop pin 328 and permit the pressure fluid to enter the cylinder rapidly through a port 330. Thus the vane will return rapidly. In the slow advance, the ball check valve is of course seated to prevent exhaust of fluid therethrough and to compel the fluid to pass through ports 312 and 320 and the interposed needle valve.

The extension of the piston rod 256 is threaded at the end to receive a nut 332 holding a block 334 having trunnions for a pair of cam follower rollers 336 adapted to engage an annular cam 338. The cam body is connected by clutch teeth to the end of the sleeve 296 and bears against a ball thrust bearing 340 inside a guard 342. The rollers are initially separated from the cam but descend rapidly with the piston rod until stopped by the cam, the small and devious passages in the short cylinder 292 being inactive until the piston rod is stopped. Thereafter the pressure will build up and cause the fluid to exhaust through the restricted passages and thereby control a slow rotation of the vane and the cam. Thus there is a rapid movement of the flange grinding wheel towards the work with a slow feed for actual grinding. The cam has a low portion and a little rise providing a dwell and a slight preliminary retraction at the conclusion of grinding. When the flow of pressure fluid is reversed, it is apparent that the piston rod 256 has control and hence the wheel will rapidly rise or return to its initial position.

*Flange grinding wheel dressing mechanism*

The wheel is automatically dressed when it rises or retreats, the dressing device D being mounted (Figs. 7, 17 and 18) on the above mentioned inclined pad 192 of the work head H, alongside of or in front of the compensating slide 198.

On the inclined pad 192 of the work head is bolted a dovetail base 346 forming a slideway for a slide 348 which is adjustable by a screw 350 threaded in the slide and journalled for rotation without endwise movement in an end plate 352 bolted to the base 346. The slide 348 has a standard or web 349 which projects upwardly and carries a pivot screw 354 for an angularly adjustable angle bracket 356, the bracket having an arcuate slot 358 for clamping screws 360. The angular location is indicated by a scale 362 on the web 349 cooperating with an index line on the bracket 356.

The heads of a double acting cylinder 364 are bolted to the upwardly extended end of the bracket. A projecting piston rod 366 which has a short stroke carries a block 368 on one side of which is fastened a lug 369 extending at a right angle from a plate 370 which is slotted to receive adjustable contact screws 372 and 374 set one ahead of the other. The ends of the screws are rounded to engage inclined cam faces on a pair of pivoted levers 376 which will close normally-open switches 377 and 377A placed one behind the other in switch boxes 378 fastened by screws and a plate 380 to the bracket 356. The levers 376 are limited in their outward movement by a long stop pin 382 secured to plate 380. The levers are pivoted on bushings supported by a long screw stud 384 secured to plate 380. The levers are spaced by a spacing sleeve 386 and are held on the screw stud by a washer 388 and lock nuts.

Fastened by screws to the lower face of the block 368 is a slide 390 which is guided on a dovetail guide plate 392 which is fastened to the bracket 356. A plate 394 is adjustably fastened by clamping screws 396 to the slide 390, the plate 394 having slots for the screws. An arm 398 projecting from the plate 394 supports a nib 400 having a dressing diamond adapted to dress the bevelled edge or conical surface 12 of the flange grinding wheel F when the latter is withdrawn or lifted from the work to an accessible location. The piston reciprocates the plate 394 to operate the diamond. The angle at which the wheel is dressed can be selected and maintained with the aid of the scale and the screws 360 in the arcuate slot, the bracket 356 and all the parts carried by it being swingable on the pivot 354. Since the switches and their operating mechanism are all carried by the bracket, the mechanism is operable in any selected angular position. The adjustment of the slide 348 by the screw 350 is to compensate for wear of the diamond, it being desirable to keep the diamond in a predetermined relation to the back face of the work. As shown in Fig. 17, the lower face of the wheel F is parallel to the axis of the work 6 and hence dressing of the wheel surface 12 does not change its distance from the work axis. Such dressing does reduce the diameter of the wheel but the above described intermittent movement of the compensating slide 198 (Fig. 3) which is also parallel to the work axis, moves the wheel to the left and compensates for such dressing and wheel wear. Accordingly, the corner of the wheel at the lower edge of the surface 12 will always feed to the same point.

As will later appear in the diagrammatic views, when the piston rod begins its advance stroke, the first switch which is closed by screw 372 energizes a solenoid operated valve to direct a stream of cooling water on the diamond. As the stroke is completed the other switch energizes a solenoid controlled valve to reverse the movement of the piston rod and retract the diamond.

Gauging mechanism

Figure 21:
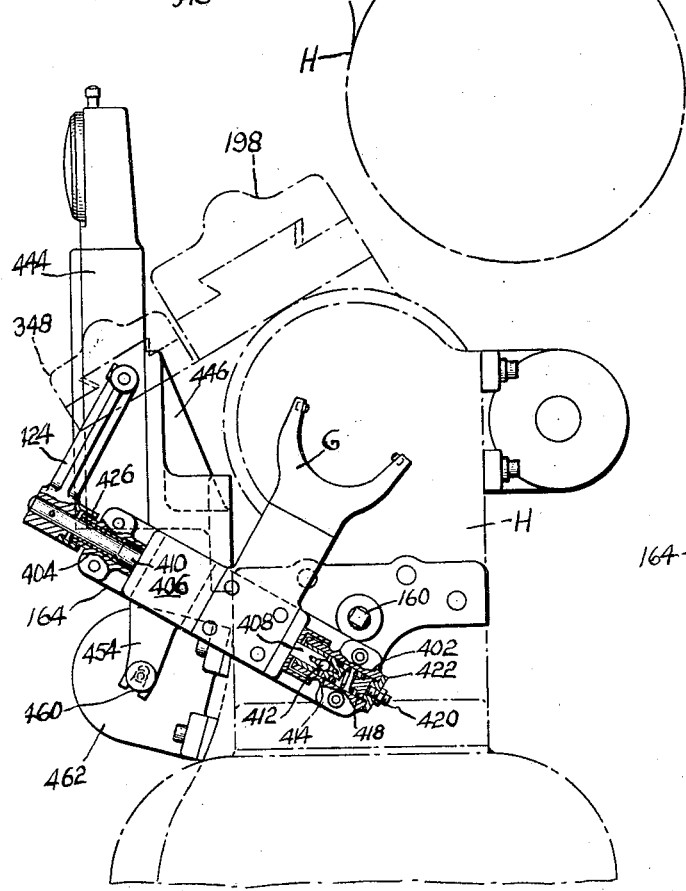
Fig. 21 is a side view of the gauge mechanism, some parts being in section.
Figure 22:
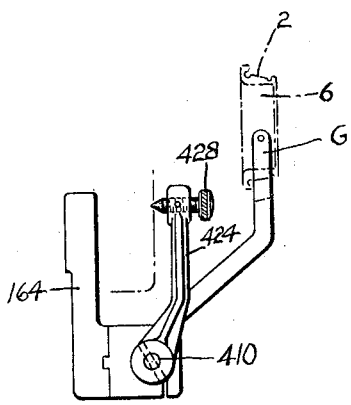
Fig. 22 is a slanting front view of a portion of the gauge mechanism.

The bracket 164 on the work head H projects forwardly and upwardly (see Figs. 21 to 25). A lower bearing 402 and an upper bearing 404 are secured to the bracket to pivotally and floatingly support a gauge bar 406 on which the forked work-gauging feeler G is fastened. The gauge bar has a lower pivot stud 408 and an upper pivot stud 410, the studs projecting from the bar and being journalled in bushings carried by the bearings 402 and 404. The lower pivot stud has a conical seat for a ball 412 which also bears in a conical seat in a slidable sleeve 414 which is urged in one direction by a coiled centering spring which is seated on a plate 418 and made adjustable by a screw 420 threaded in a bearing cap 422. The centering spring lets the gauge float or center itself by contact with the work.

The upper stud 410 is long enough to project through the upper bearing 404 and has an arm 424 secured thereto by a tapered pin, the arm carrying a water seal 426 covering the bearing. The arm projects upwardly and carries an adjusting screw 428 which bears on a hardened insert 430 in an actuating rod 432 which slides in bushings 434 set in a bore in the dovetail base 346 of the dressing device, the rod being urged in one direction by a coiled spring 438. At the inward end of the rod, a fork 440 is attached, the fork embracing an enlarged head 442 on a plunger projecting from a gauge or indicator box 444 mounted on a bracket 446 which is adjustably fastened to the work head. The spring 438 yieldably resets the gauge parts, as will appear, when the work sizing feeler or forked gauge G is moved out of engagement with the work, the spring then causing the fork 440 to pull out on the plunger. Hardened inserts are interposed between the fork 440 and the head 442.

The feeler G straddles the work and its two diamond feeler points are normally urged substantially parallel to the work axis and lengthwise of the tapered work surface 2 being ground in order to promote sensitivity. The feeler is urged against the work by a coil spring 448 interposed between a check nut 450 and a slidable flanged bushing 452 which bears against a forked arm 454 attached to the gauge bar 406. The nut and bushing are supported on a headed stud 456 threaded in the end of a piston rod 458 and projecting through the forked arm, the stud having a head 460 adapted to engage the forked arm 454 when the piston rod is pulled into its cylinder 462. This movement retracts the forked feeler from the work and controls resetting of the gauge parts. When new work is inserted, a needle valve indicated in the diagram causes the piston to delay the return of the feeler to the work until the surface has been ground well down towards the desired size.

The headed plunger 442 slides in a boss 464 on the indicator box and the end of it engages the tip of a bell crank lever 466 pivoted on a pivot screw 468 and carrying a disc or cylinder 470 which engages the stem 472 of a visual indicator 474. The bell crank lever is urged in one direction by a coil spring 476 to engage the inner end of the headed plunger 442. A pair of sizing levers 478 are pivoted on an eccentric shaft 480 which is angularly adjusted by a knob 482 and clamped by a nut 484. Each lever carries a contact screw 486 adapted to engage a contact screw 488 on the box to complete an electric circuit. A coil spring 490 urges each lever in a direction to engage its hardened insert 492 with the cylinder or disc 470 and eventually to snap the lever to circuit completing position under control of the cylinder or disc 470 which moves very slowly upwardly as the work changes in size. One lever is arranged to snap past the cylinder before the other, the two levers each having a slit and a wedging screw 494 so that one can be adjusted to be slightly shorter than the other. As will appear, the first circuit to be completed energizes a solenoid which reduces the feed of a grinding wheel ratchet mechanism from coarse to fine and the other energizes a solenoid to stop a pawl feeding motor. When the work feeler or gauge G is withdrawn from the work, the sizing levers 478 are reset by the headed plunger 442 which is pivoted loosely by a pin to a resetting lever 496 having hooks 498 to engage behind bent pins 500 on the sizing levers.

Work loading mechanism

The loader (Figs. 26 to 31) comprises a base 502 fastened on the housing 140, the base having a part 504 slanting upwardly and braced by a web. Fastened to the top of the upwardly slanting part is a long base plate 506 having a supporting post 507. A dovetail tongue 508 is fastened to the base plate to guide a slide 510. At the front of the slide is fastened a plate 512 and fastened to this, in an offset position to line up with the chuck C, is a nest adapter 514 having a conical hole and three external notches for a pair of side fingers 516 and a lower finger 518. The fingers are pivoted on pins 520 and project into notches of a nest 522 fastened to the adapter 514, a coil spring 524 urging each finger to engage the little rib 8 on the race ring 6.

The nest is U-shaped and opens upwardly to receive the rings from a fixed magazine composed of bars 526 connected by straps 528 and supported in fixed position by a bracket 530 attached to the slanting part 504. The bars have internal ridges 532 to conform to the angle between the tapered raceway surface 2 of the ring and the rib 8 thereof. These ridges guide the rings and hold them in the magazine. The bottom and sides of the nest are composed of an internal cylindrical surface and a tapered surface 534 fitting the taper of the bearing raceway, the spring pressed fingers 516 and 518 holding the ring releasably in the nest. The springs yield when the race ring is gripped by the chuck after the nest, adapter, fingers, etc. are advanced by the slide 510 and start to return. The lowest article of those remaining in the magazine when the loader advances is supported by a latch 536 pivoted on a plate 537 and having a work supporting lug 538 urged below the work by a spring 540. A lug 542 on the adapter 514 trips the latch when the slide returns.

The slide 510 is actuated by a cylinder and piston unit 544 mounted on an offset of the base plate 506, the slide being connected to the piston rod by a bar 546. When the slide 510 advances, the bar 546 actuates the plunger of a switch 548 secured by a bracket to plate 506, this switch controlling the chuck. When the slide 510 retreats, it actuates another switch 552 to control starting of the cycle of grinding. The slideways are covered at the sides by cover plates 553 attached to the slide. The rear end of the slide has a cover 554 with a projecting lug 556 pivotally supporting a dog 558 which is urged by a spring 560 against a stop pin 562. The end of the dog will engage a tapered surface on a pivoted switch lever 564 to actuate the switch 552 when the slide retreats. When the slide advances, the dog swings idly over the hooked end of the switch lever. The switch 552 is mounted on a bracket secured to the base plate 506 and its plunger urges the lever 564 against a stop pin 566.

*Main or cylindrical wheel feeding mechanism*

The cylindrical grinding wheel W has its spindle journalled in a housing on the main wheel slide 600 and driven by a belt pulley. (See Figs. 1 and 32 to 37.) The spindle is given a short reciprocation at uniform speed by any suitable gearing in a casing 601. The main wheel slide is slidable upon dovetail ways on a base plate 602 which is fastened to the main frame. The main slide has sleeve bearings 604 in which a feed screw shaft 606 is journalled for rotation, the feed screw being held from endwise movement by thrust bearings 608, one interposed between a collar 610 on the feed screw and one of the sleeve bearings, the other interposed between the other sleeve bearing and a washer backed up by an adjusting nut 614. The feed screw is threaded in a feed nut 616 and in a take-up nut 618 which prevents backlash by being pressed by a coil spring 620 away from the feed nut, the take-up nut being guided at the bottom in a groove of a lower or sub-slide 622. The feed nut is secured by screws and tapered dowels 624 to the top of the sub-slide so that turning of the feed screw will advance the main slide with respect to the sub-slide. Before the feed screw is turned, the two slides are advanced quickly as a unit by a cylinder and piston unit. The cylinder 626 is attached to a plate 628 which is bolted in a groove in the bottom of the fixed base plate 602. A piston rod 630 projects from the cylinder and is secured to a bracket 632 which passes up through a slot in the base plate and is fastened to the bottom of the sub-slide. Advance of the sub-slide is limited by an abutment pin 634 therein which engages a stop pin 636 secured to a block 638 mounted in a groove of the base plate 602.

To control certain phases of the machine cycle, the movement of the piston rod is caused to actuate switches. A rod 640 which is screw threaded into the piston rod to clamp it to the bracket 632 projects into a switch housing 642 having a cover 644. A contact bar 646 is clamped against a shoulder of the rod by a nut 648 and has a contact screw 650 adjustably clamped therein in a position to engage the plunger of a switch 652 which is normally open and mounted on the bottom of an angle bracket 653. Fastened on the rod by a set screw is a plate 654 on the bottom of which a dog 656 is pivoted and urged against a stop pin 658 by a light coil spring 660. The outer end of the dog is bevelled and, when it is carried to the left by the piston rod, it engages a bevelled surface on a switch lever 662 which is pivoted on a bracket which supports a normally open switch 664. The switch is closed as the dog 656 passes to the left along the lever 662. When the piston advances again, the dog 656 can swing clockwise and ride idly over the lever 662 without closing the switch. On this advance, the other switch 652 is closed. The function of the switches will best appear from the description of the diagrammatic views.

The feed screw is ratchet operated under control of cylinder and piston units. The screw shaft 606 is journalled in a ball bearing 666 clamped in a bearing bracket 668 by a flanged sleeve 670. Journalled on the screw shaft by a ball bearing 672 is a ratchet housing 674 which is part of a hand wheel having a handle 676. The bearing 672 is protected by a cover plate 677 dished around the bearing holding nut. The rear of the housing is closed by a ring 678 which clamps a feed ratchet wheel 680, the ring turning freely around a hub member 682 to which a retracting ratchet wheel 684 is secured by screws. The teeth of the retracting ratchet wheel 684 face in the opposite direction from the teeth of the feed ratchet wheel 680. A return pawl 686 engages ratchet wheel 684 and is pivoted by a stud 688 on an arm 690 whose hub is journalled on an extension of the bearing bracket 668. Coil springs 692 are interposed between backing shoes and hollow brake shoes 696 which engage an extended portion of the hub member 682 to prevent return movement of the ratchet 684 when the pawl is idly retracted. Keyed to another extension of the hub member is a sun gear 698 meshing with a planet pinion 700 which is formed integral with a second planet pinion of slightly smaller size and meshing with a gear 702 keyed to the feed screw shaft 606. The planet pinions are journalled on a bushing supported by a shaft 704 fixed in the housing 674 and to the ring 678.

Referring particularly to Figs. 36 and 37, a feed pawl 706 is secured by a clamp 708 to a pawl holder 710 which is pivoted in the forked end of a piston rod 712. A spring pressed plunger 714 sliding in a hole of the piston rod urges the pawl against the ratchet wheel. A cross head or bar 716 is clamped to the piston rod and has a tongue 718 guided in a groove of a bracket 720 to prevent the rod from turning. The bracket 720 is bolted to the main slide 600 and supports a feed cylinder 722. Adjustable limit screws 724 and 726 are mounted on the bar 716, the first adapted to engage a stop lug 727 on the cylinder to limit the stroke of the piston for coarse feeding. The other screw 726 limits the stroke of the piston for fine feeding when a swinging latch lever 728 is swung under it. The latch lever is a bell crank pivoted on the cylinder and urged to inoperative outward position by a coil spring 730. The latch lever is connected by a link 732 to the plunger of a push solenoid 734 which is secured by a bent bracket 736 to the cylinder. The solenoid is energized under control of the first gauge-operated switch which makes contact when the work is nearly down to size.

Turning of the feed ratchet wheel 680 backwardly with the return stroke of the feed pawl is resisted by a brake shoe 737 pressed by a coil spring against the ring 678. The spring is backed up by an adjusting screw plug 740 threaded in an arm 742 of the bracket 668, the bracket having another arm 744 in which a stop screw 746 is adjustably mounted to limit the stroke of the retracting pawl 686 by engagement with the pawl carrying arm 690. The pawl is urged against the ratchet wheel by a coil spring mounted in the arm 690 under a screw plug 748 and engaging a stud 750 which projects sidewise from the pawl into a slot in the arm. The pawl is an angled lever whose upright arm is adapted normally to engage an adjustable stop screw 752 mounted in a lug 754 bolted to a boss on the bracket 720. This is to hold the pawl positively against the retracting ratchet wheel while the other or feed ratchet is being fed. A link 756 connects the arm 690 to the piston rod 758 of a retracting cylinder 760 which is bolted to the bracket 720.

Assuming the wheel slide has had its quick advance by the piston, the piston rod 712 of the feed cylinder is repeatedly reciprocated and the feed pawl will advance the feed ratchet wheel 680. This turns the hand wheel housing 674 which carries the planet pinions bodily around the sun gear 698 which is then anchored by the retracting ratchet wheel and pawl. The gear 702 and the feed screw shaft 606 will rotate very slowly due to the planetary reduction gearing. The feed stroke is limited at first by the stop screw 724 and later by the stop screw 726 when the latch lever 728 is swung in as shown. When the work is down to size, there is a timed dwell by a timing switch as will appear and then the retracting piston rod 758 is advanced. This swings the pawl arm 690 as far as the stop screw 746 and turns the retracting ratchet wheel 684 and the sun gear and feed screw backwardly so that the wheel slide is retracted with respect to the sub-slide ready for a new feed by the ratchet. The amount of retraction is adjusted by the stop screw 746 to an amount which will compensate for stock removal. After the retracting piston is advanced to effect the foregoing retraction, it returns idly to the initial position to again make the retracting pawl lock the retracting ratchet wheel in fixed position. The two slides and the ratchet feed mechanism are retracted as a unit by the main piston rod 630. The switch 664 is closed when the slides retreat and the switch 652 is closed when the slides advance. The action of these switches will appear from the diagrammatic views.

*Operation*

Assuming an unground work piece has been carried by the loader L to the chuck C and clamped by the draw bar operated by the cylinder and piston unit 108 so that the piece is ready to be ground, a cycle of the machine can most conveniently be described from this point by reference to the diagrams. The retreat of the loader causes the normally open switch 552 to close and energize a coil 798 to close a two-pole switch 800 the latter closing another circuit to energize a coil 802 of a main reversing valve 804. The reversing valve is connected to a motor driven pump 806 and directs pressure fluid through a pipe 808 and a number of its branches to the five cylinders 626, 260, 292, 462 and 760.

The cylinder 626 causes the main grinding wheel slide 600 (and the sub-slide 622) to advance rapidly until the stops 634 and 636 come in contact. The wheel is thus ready to begin grinding under its coarse feed when the ratchet mechanism starts. The flange grinding wheel cylinder 260 causes its piston rod to descend rapidly until the cam rollers 336 engage the rotatable cam 338. The flange grinding wheel F is thus ready to begin grinding under the slow feed thereafter controlled by rotation of the cam 338 as the rotor or vane turns in the cylinder 292. The pawl-retracting cylinder 760 operates the retracting pawl in the idle direction to reset the pawl ready for subsequent action after grinding is done. The gauge shifting cylinder 462 operates to shift the forked feeler gauge G towards the work but this movement is rendered slow by a needle valve 810 and a ball check valve 812 in the piping; the engagement of the gauge with the work is thereby postponed until the work has had considerable grinding and this lessens the wear on the gauge points.

As the main wheel slide 600 is thus shifted forwardly by the cylinder 626, the contact screw 650 closes the normally open switch 652 and thus completes a circuit through a coil 814 which closes a normally-open three-pole switch 816, thereby starting a pawl feed motor 818 whose shaft has a cam 820. The cam repeatedly reciprocates the plunger of a valve 822 piped to a pilot valve 824 which causes repeated reciprocation of the piston in the feed cylinder 722. The feed cylinder causes the feed pawl 706 to operate at its initial coarse feed stroke as determined by the stop screw 724 so that the grinding wheel slide 600 is advanced rather slowly with respect to the sub-slide 622 by the feed screw. As grinding proceeds, the fork gauge controls the release of the first sizing lever 478 in the indicator box 444 and a circuit is completed by the corresponding contact screw 486 to close a normally open switch 826. Hence the solenoid 734 near the feed cylinder is energized to place the latch lever 728 in the path of the stop screw 726 thereby reducing the stroke of the feed pawl to a fine feed stroke.

As the work reaches final size, the fork gauge controls the release of the second sizing lever and a circuit is completed by the other contact screw 486 to shift a double acting switch 828. This opens the circuit which energized the coil 814 of the three-pole switch 816 so that the switch opens and the feed motor 818 stops. The double acting switch 828 also closes a circuit which starts a timing switch 830 which keeps the grinding wheel W in its forward position for a predetermined short interval for sparking out. Meanwhile the flange grinding wheel F has completed its grinding including a dwell in advanced position and including also a very short retreat upwardly controlled by the contour of the rotary cam 338. The flange grinding wheel F thus finishes its feed and grinding action on the flange or shoulder 4 before the wheel W is withdrawn from the raceway 2 although up to this point both wheels grind simultaneously.

At the end of the predetermined interval when the timing switch closes its contacts at 832 and opens its contacts at 834, coils 836 and 838 are energized. Coil 838 closes a normally open switch 840 and energizes a coil 842 to reverse the main valve 804. This reverses the pistons in the five cylinders 626, 260, 292, 462 and 760 so that the main wheel slide retreats, the flange grinding wheel retreats and is dressed, the feeler gauge is retracted from the work resetting the movable gauge contacts, and the retracting pawl is actuated to reset or turn back the ratchet mechanism ready for a new feed. At the same time, coil 836 reverses a four-way valve 844 which controls the chucking cylinder 108 and releases the work-clamping fingers. The cylinder 626 retracts the main wheel slide 600 and the sub-slide as a unit so that the grinding wheel W is moved out of the way for discharge of the work.

As the cylinder 626 reverses, the switch 652 is immediately allowed to open to preclude undesired energizing of the coil 814 and prevent any action of the feed motor 818 because the normally closed contacts of the double acting switch 828 will close when the gauge is withdrawn from the work after it is ground and would otherwise start the feed motor when such action would be premature. Near the end of the return movement of the main wheel slide, the switch 664 is closed by the dog 656 and completes a circuit energizing the solenoid 184 which operates the ejector E. A solenoid 846 is also energized to reverse a four-way valve 848 which controls the loading cylinder 544 to advance the loader with a new work-piece from the magazine to the chuck. As this loading cylinder completes the loading or advance stroke of its piston, the normally open switch 548 is closed to energize a solenoid 850 and reverse the valve 844 thereby reversely actuating the piston of the chucking cylinder 108 and clamping the new piece in the chuck. And as the piston in the chucking cylinder completes its chucking stroke, the switch at 110 is closed by the dog 116 thus energizing a solenoid 852 and reversing the valve 848 to retract the loader. The retreat of the loader starts another cycle of grinding by again closing the switch 552 as previously described. The cycle above is complete except for the dressing of the flange grinding wheel F which can be made to occur automatically at every cycle or to occur manually after any number of cycles under control of a switch 854.

For automatic dressing at every cycle, the switch 854 is set in closed position. Whenever the cylinder 260 retracts the flange grinding wheel from the work, the switch 262 is closed near the end of the stroke by the dog 276. This energizes the coil 220 which gives the compensating feed to the slide 198. It also energizes a solenoid 856 to reverse a four-way valve 858 which controls the dressing cylinder 364 and so moves the dressing diamond across the wheel. As the diamond slide begins its movement, it closes the switch 377 and energizes a solenoid 860 which controls a valve (not shown) which turns on cooling water for the diamond. As the diamond slide completes its advance stroke, the switch 377A is closed thereby energizing a solenoid 862 which reverses the valve 858 and so controls return movement of the diamond slide, the diamond traversing the wheel in the opposite direction.

I claim:

1. In a machine for grinding an overhanging tapered shoulder adjacent to an external surface on a work piece, a work holder for rotating the work piece, a grinding wheel having a conical flange overlying the external surface clear of the latter and terminating in a conical operating surface lying at the same angle to the work axis as the shoulder, the wheel being dished and having its drive shaft slanted back laterally of the work, and means for feeding the wheel in a line of direction which extends crosswise of the flange and makes a small angle with the shoulder.

2. In a machine for grinding an overhanging tapered shoulder adjacent to an external surface on a work piece, a work holder for rotating the work piece, a grinding wheel clearing said external surface and having a conical flange terminating in a conical surface to engage the shoulder, the wheel being dished and having its drive shaft slanted back laterally of the work to leave the end of the work holder substantially unobstructed laterally, and a loading device for delivering work axially to the work holder and across the end of the drive shaft.

3. In a machine for grinding an overhanging tapered shoulder on a work piece, a work head having a work holder for rotating the work piece, a grinding wheel having a conical operating surface, means for slowly feeding the wheel in a line of direction making a small angle with the shoulder, a compensating slide mounted on the work head for movement parallel to the work axis, the slide supporting the wheel and its feeding means, and means for shifting the slide on the work head at intervals to compensate for wear of the wheel.

4. In a machine for grinding an overhanging tapered shoulder on a work piece, a work head having a work holder for rotating the work piece, a grinding wheel having a conical operating surface, a feed slide for slowly feeding the wheel in a line of direction making a small angle with the shoulder, a compensating slide mounted on the work head for movement parallel to the work axis, and a plate swingable on the compensating slide for setting the feed slide at a selected angle to the shoulder.

5. In a machine for grinding a ring having an external conical surface and an internally conical overhanging shoulder, a work holder for rotating the ring on a fixed axis, a grinding wheel having a conical flange with a conical operating surface at its edge to engage the internal conical shoulder, the wheel being dished to form the conical flange and having its drive shaft slanted back laterally of the shoulder to make the wheel clear the external surface and leave the work holder substantially unobstructed axially.

6. In a machine for grinding a ring having an external conical surface and an internally conical overhanging shoulder, a work holder for rotating the ring on a fixed axis, a grinding wheel having a conical flange terminating in a conical operating surface to grind the internal conical shoulder, the wheel being dished and having its drive shaft slanted back laterally of the shoulder to make the wheel clear the external surface, and that portion of the conical flange which is nearest to the work being maintained parallel to the work axis as the operative edge of the wheel wears away.

7. In a machine for grinding a ring having an external conical surface with an outstanding rib at its small end and an interally conical overhanging shoulder at the large end, a work holder for rotating the ring on its axis, a first grinding wheel to engage the external surface, a second grinding wheel having a flange with a conical operating surface to engage the internal conical shoulder, the second wheel being dished and having its drive shaft slanted back laterally of the shoulder to make said second wheel clear the external surface and the outstanding rib.

8. In a machine for grinding a ring having an external conical surface and an internally conical overhanging shoulder near one end of the external surface, a work holder for rotating the ring on a fixed axis, a large grinding wheel to engage the external surface, a small grinding wheel having a conical operating surface to engage the internal conical shoulder, and means for simultaneously feeding the wheels towards their respective work surfaces for simultaneous grinding thereof.

9. In a machine for grinding a ring having an external conical surface and an internally conical overhanging shoulder near one end of the external surface, a work holder for rotating the ring on a fixed axis, a first grinding wheel to engage the external surface, a second grinding wheel having a conical flange with a conical operating surface at its edge to engage the internal conical shoulder, the second wheel being dished and having its drive shaft slanted back laterally of the shoulder to make said second wheel clear the external surface, and means for simultaneously feeding the wheels towards their respective work surfaces for simultaneous grinding thereof.

10. In a machine for grinding an external surface and an adjacent overhanging internal conical surface, a work holder for rotating the work on its axis, a first grinding wheel to engage and grind the external surface, a second grinding wheel clearing the external surface and having a conical operating surface to engage the internal surface, means for feeding the first wheel against the extrenal surface, and means for feeding the second wheel at a small angle to the conical surface while the first wheel is being fed to effect simultaneous grinding of both surfaces.

11. In a machine for grinding an external surface and an adjacent overhanging internal conical surface, a work head, a work holder for rotating the work on its axis, a first grinding wheel to engage and grind the external surface, a second grinding wheel clearing the external surface and having a conical operating surface to engage the internal surface, means for feeding the first wheel against the external surface, a feed slide supporting the second grinding wheel and movable at a small angle to the conical surface to feed said second wheel while the first wheel is being fed, and a compensating slide supporting the feed slide and mounted on the work head for sliding movement to shift the second wheel axially of the work.

RAYMOND H. CRAMER.